US012228117B2

(12) United States Patent
Shultz et al.

(10) Patent No.: US 12,228,117 B2
(45) Date of Patent: Feb. 18, 2025

(54) PUMP CONTROL SYSTEM AND METHOD

(71) Applicant: Graco Minnesota Inc., Minneapolis, MN (US)

(72) Inventors: Mark D. Shultz, Ham Lake, MN (US); Robert J. Gundersen, Otsego, MN (US); Rami A. Azer, Dayton, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 404 days.

(21) Appl. No.: 17/332,239

(22) Filed: May 27, 2021

(65) Prior Publication Data

US 2021/0372383 A1 Dec. 2, 2021

Related U.S. Application Data

(60) Provisional application No. 63/153,516, filed on Feb. 25, 2021, provisional application No. 63/127,241,
(Continued)

(51) Int. Cl.
*F04B 13/00* (2006.01)
*B67D 7/00* (2010.01)
(Continued)

(52) U.S. Cl.
CPC .............. *F04B 13/00* (2013.01); *B67D 7/005* (2013.01); *B67D 7/0288* (2013.01); *F04B 15/02* (2013.01);
(Continued)

(58) Field of Classification Search
CPC ........ F04B 17/03; F04B 49/06; F04B 49/065; F04B 49/20; F04B 15/00; F04B 15/02
(Continued)

(56) References Cited

U.S. PATENT DOCUMENTS 1,713,517 A 5/1929 Boe
2,889,857 A 6/1959 Ames
(Continued)

FOREIGN PATENT DOCUMENTS

| | | | |
|---|---|---|---|
| EP | 0293382 | A1 | 12/1988 |
| EP | 0985825 | A2 | 3/2000 |
| KR | 101686767 | B1 | 12/2016 |

OTHER PUBLICATIONS

International Preliminary Report for Patentability for PCT Application No. PCT/US2021/034471, Dated Nov. 17, 2022, pp. 12.
(Continued)

*Primary Examiner* — Kenneth J Hansen
*Assistant Examiner* — Chirag Jariwala
(74) *Attorney, Agent, or Firm* — Kinney & Lange, P. A.

(57) ABSTRACT

A transfer pump includes a drive module having electronic components and a fluid module not including electronic components. The drive module provides motive power to a pump of the fluid module to power pumping by the fluid module. A control module is configured to monitor operation of the transfer pump and control pumping by the transfer pump. The control module is configured to receive dosing commands from a user interface, recall a dosing parameter based on the dosing command, and cause the drive module to operate the fluid module based on the dosing parameter to cause the transfer pump to output a set volume of material.

19 Claims, 30 Drawing Sheets

Related U.S. Application Data filed on Dec. 18, 2020, provisional application No. 63/032,161, filed on May 29, 2020.

(51) Int. Cl.

| | |
|---|---|
| ***B67D 7/02*** | (2010.01) |
| ***F04B 15/02*** | (2006.01) |
| ***F04B 17/03*** | (2006.01) |
| ***F04B 23/02*** | (2006.01) |
| ***F04B 49/06*** | (2006.01) |
| ***F04B 51/00*** | (2006.01) |
| ***F04B 53/14*** | (2006.01) |
| ***F04B 53/16*** | (2006.01) |
| *E04F 21/06* | (2006.01) |

(52) U.S. Cl.

CPC ............ *F04B 17/03* (2013.01); *F04B 23/028* (2013.01); *F04B 49/065* (2013.01); *F04B 51/00* (2013.01); *F04B 53/14* (2013.01); *F04B 53/162* (2013.01); *E04F 21/06* (2013.01)

(58) Field of Classification Search

USPC ............................................................ 222/63

See application file for complete search history.

(56) References Cited

U.S. PATENT DOCUMENTS

| | | | | |
|---|---|---|---|---|
| 2,895,421 | A | | 7/1959 | Peeps |
| 3,295,453 | A | | 1/1967 | Scott |
| 3,502,029 | A | | 3/1970 | Halladay |
| 4,009,971 | A | | 3/1977 | Krohn et al. |
| 4,177,937 | A | | 12/1979 | Schlensker et al. |
| 5,228,842 | A | | 7/1993 | Guebeli et al. |
| 5,334,001 | A | | 8/1994 | Williams |
| 5,497,812 | A | | 3/1996 | Orosco et al. |
| 6,097,993 | A | * | 8/2000 | Skupin .................. G01F 15/003 700/240 |
| 6,183,224 | B1 | | 2/2001 | Conatser |
| 6,799,704 | B2 | | 10/2004 | Carleton |
| 8,177,524 | B1 | | 5/2012 | Kieffer et al. |
| 10,125,763 | B1 | | 11/2018 | St. James et al. |
| 2007/0122301 | A1 | | 5/2007 | Schlecht |
| 2008/0292481 | A1 | | 11/2008 | Castagnetta et al. |
| 2013/0001243 | A1 | | 1/2013 | Quick |
| 2015/0014351 | A1 | * | 1/2015 | Grontved et al. ...... B05B 12/02 222/333 |
| 2016/0069344 | A1 | | 3/2016 | Carey et al. |
| 2016/0186743 | A1 | | 6/2016 | Thompson et al. |
| 2016/0186788 | A1 | | 6/2016 | Davidson et al. |
| 2016/0319811 | A1 | * | 11/2016 | Daniski ................... F04B 49/20 |
| 2017/0191563 | A1 | | 7/2017 | Horning et al. |
| 2020/0173430 | A1 | | 6/2020 | Hughes et al. |
| 2020/0232456 | A1 | | 7/2020 | Plantard et al. |

OTHER PUBLICATIONS

International Preliminary Report on Patentability for PCT Application No. PCT/US2021/034466, Dated Nov. 17, 2022, pp. 24.

International Search Report and Written Opinion for PCT Application No. PCT/US2021/034466, Dated Sep. 13, 2021, pp. 30.

Invitation to Pay Additional Fees for PCT Application No. PCT/US2021/034466, Dated Jul. 19, 2021, pp. 27.

International Search Report and Written Opinion for PCT Application No. PCT/US2021/034471, Dated Jul. 21, 2021, pp. 16.

* cited by examiner

PUMP CONTROL SYSTEM AND METHOD

CROSS-REFERENCE TO RELATED APPLICATIONS

This application claims the benefit of U.S. Provisional Application No. 63/032,161 filed May 29, 2020, and entitled "MUD AND FILLER PUMP," and claims the benefit of U.S. Provisional Application No. 63/127,241 filed Dec. 18, 2020, and entitled "TRANSFER PUMP," and claims the benefit of U.S. Provisional Application No. 63/153,516 filed Feb. 25, 2021, and entitled "TRANSFER PUMP," the disclosures of which are hereby incorporated by reference in their entireties.

BACKGROUND

The present disclosure relates generally to pumps. More specifically, the disclosure relates to transfer pumps.

Transfer pumps can be used to pump mud, filler, and other thick fluids. Mud will be used herein as an example, but any other type of fluid can be pumped instead. The mud is used in construction applications, such as filling in wall and ceiling gaps (particularly with drywall), smoothing, and creating parts of walls, ceilings, and other structures. Such mud can be mixed on the construction site, such as in a five gallon bucket, or can be shipped premade and then opened on site. The mud is pumped from the bucket to a dispensing nozzle to fill a tool. The dispensing tool then dispenses the mud to walls, ceilings, and other structures, which is typically then smoothed and which then dries in place. Such mud is typically composed of water, limestone, expanded perlite, ethylene-vinyl acetate polymer, attapulgite, and other ingredients, amongst other options.

SUMMARY

According to one aspect of the disclosure, a transfer pump configured to pump material from a bucket having an annular lip defining an opening into the bucket includes a fluid module and a drive module. The fluid module includes a mounting frame; a cylinder extending from the mounting frame in a first axial direction along a pump axis; a piston extending through the mounting frame and into the cylinder, the piston configured to reciprocate along the pump axis to pump material from the bucket; and a stand connected to the mounting frame and configured to interface with a surface to support the transfer pump on the surface. The drive module is supported by the fluid module and includes an electric motor operably connected to the piston by a dynamic interface; a power source configured to provide power the electric motor; and a drive frame configured to interface with the mounting frame at a static interface. The transfer pump is mountable to the bucket such that a wall of the bucket is disposed radially between the cylinder and the mounting stand. The electric motor and power source are spaced in a second axial direction from the mounting frame, the second axial direction opposite the first axial direction.

According to an additional or alternative aspect of the disclosure, a transfer pump configured to pump material from a bucket having an annular lip defining an opening into the bucket includes a fluid module configured to extend at least partially into the bucket to contact a fluid within the bucket; a drive module structurally supported on the fluid module at a static interface and wherein the drive module has an electric motor configured to power pumping by the fluid module at a dynamic interface; and a stand connected to the fluid module and spaced radially from a pump axis of the fluid module, the stand configured to interface with a surface to support the transfer pump on the surface.

According to yet another additional or alternative aspect of the disclosure, a transfer pump configured to pump material from a bucket having an annular lip defining an opening into the bucket includes a fluid module configured to extend at least partially into the bucket to contact a fluid within the bucket, the fluid module including a piston configured to reciprocate along a pump axis to pump the fluid; and a drive module removably mounted to the fluid module by a static interface and a dynamic interface, where the drive module includes an electric motor operatively connected to the piston to power reciprocation of the piston, and wherein the drive module is structurally supported on the fluid module at the static interface, and the drive module transmits reciprocating mechanical motion to the piston at the dynamic interface. The drive module is mountable to the fluid module in a plurality of orientations such that a drive housing of the drive module extends in a different radial direction relative to the pump axis in each of the plurality of orientations.

According to yet another additional or alternative aspect of the disclosure, a transfer pump configured to pump material includes a fluid module including a reciprocating pump configured to reciprocate along a pump axis to pump the material; and a drive module movably mounted to the fluid module by a static interface and a dynamic interface, wherein the drive module includes an electric motor operatively connected to the fluid module to power reciprocation of the pump. One of the drive module and the fluid module structurally supports the other one of the drive module and the fluid module at the static interface. The drive module transmits reciprocating mechanical motion to the pump at the dynamic interface.

According to yet another additional or alternative aspect of the disclosure, a method of mounting a drive module of a transfer pump to a fluid module of the transfer pump, the drive module including an electric motor configured to power reciprocation of a pump of the fluid module along a pump axis, the method including positioning the drive module relative to the fluid module such that an outer lower surface of a drive link of the drive module contacts the upper surface of a head of the fluid moving member; reducing an axial distance between the drive module and the fluid module until a mounting post of the drive module is disposed in an alignment groove formed on a receiver of the fluid module, wherein drive link can displace the fluid moving member as the axial distance is reduced; aligning the mounting post with the receiver; and reducing a radial distance between the drive module and the fluid module to position the mounting post within the receiver, thereby forming a static connection between the drive module and the fluid module, and to position the head within a mounting slot of the drive link, thereby forming a dynamic connection between the drive module and the fluid module.

According to yet another additional or alternative aspect of the disclosure, a transfer pump configured to pump material includes a fluid module and a drive module connectable to the fluid module at a dynamic interface and a static interface. The fluid module includes a mounting frame; and a pump having a fluid moving member configured to reciprocate along a pump axis to pump material. The drive module includes an electric motor operably connected to the fluid moving member by the dynamic interface; a power source configured to provide power to the electric motor, wherein the power source is a battery; and a drive frame configured to interface with the mounting frame at the static interface.

According to yet another additional or alternative aspect of the disclosure, a transfer pump configured to pump material from a bucket having an annular lip defining an opening into the bucket includes a fluid module configured to extend at least partially into the bucket to contact a fluid within the bucket; a drive module removably mounted to the fluid module by a static interface and a dynamic interface, where the drive module is structurally supported on the fluid module at the static interface and wherein the drive module transmits reciprocating mechanical motion to the fluid module to cause pumping at the dynamic interface; and a stand connected to the fluid module and spaced radially from a pump axis of the fluid module, the stand configured to interface with a surface to support the transfer pump on the surface. The drive module includes electronic components of the transfer pump and the fluid module does not include any of the electronic components such that the electronic components can be separated from the fluid module by breaking the static interface and the dynamic interface.

According to yet another additional or alternative aspect of the disclosure, a method of mounting a drive module of a transfer pump to a fluid module of the transfer pump, the drive module including an electric motor configured to power reciprocation of a piston of the fluid module along a pump axis, includes positioning the drive module over the fluid module such that an outer lower surface of a drive link of the drive module contacts the upper surface of a head of the piston; shifting the drive module in a first axial direction and axially closer to the fluid module until a mounting post of the drive module is disposed in an alignment groove formed on a receiver of the fluid module, wherein drive link can displace the piston in the first axial direction as the drive module shifts in the first axial direction; aligning the mounting post with the receiver; and shifting the drive module radially towards the fluid module to position the mounting post within the receiver, thereby forming a static connection between the drive module and the fluid module, and to position the head within a mounting slot of the drive link, thereby forming a dynamic connection between the drive module and the fluid module.

According to yet another additional or alternative aspect of the disclosure, a transfer pump configured to pump material from a bucket having an annular lip defining an opening into the bucket includes a fluid module configured to extend at least partially into the bucket to contact a fluid within the bucket, the fluid module including a piston configured to reciprocate along a pump axis to pump the fluid; a drive module including an electric motor operatively connected to the piston to power reciprocation of the piston; and a control module operably connected to the electric motor. The control module is configured to receive a dosing command from a user interface of the drive module; recall, from a memory of the drive module, a dosing parameter based on the dosing command, wherein the dosing parameter is associated with a dose volume; and operate the electric motor based on the dosing parameter such that the transfer pump outputs the dose volume.

According to yet another additional or alternative aspect of the disclosure, a method of pumping with a transfer pump includes receiving, at a control module of the transfer pump, a dosing command from a user interface of the transfer pump; providing, by a control module of the transfer pump, power to an electric motor of the transfer pump to activate the electric motor; and removing, by the control module, power from the motor based on an operating parameter of the transfer pump reaching a dosing parameter associated with the dosing command.

According to yet another additional or alternative aspect of the disclosure, a method of pumping with a transfer pump includes receiving, at a control module of the transfer pump, a learning mode command from a user interface of the transfer pump; providing, by the control module and based on a dispense command from the user interface, power to an electric motor of the transfer pump to cause the electric motor to drive displacement of a piston of the transfer pump to cause the transfer pump to pump a first volume of fluid; recording, in a memory of the transfer pump, an operating parameter associated with the first volume as a dosing parameter and exiting, by the control module, the learning mode; and dispensing the first volume of fluid. Dispensing the first volume of fluid includes providing, by the control module, power to the electric motor of the transfer pump based on a dosing command received at the control module from the user interface; and comparing, by the control module, an actual operating parameter to the dosing parameter; and removing, by the control module, power from the electric motor based on the actual operating parameter reaching the dosing parameter.

According to yet another additional or alternative aspect of the disclosure, a transfer pump configured to pump material from a bucket having an annular lip defining an opening into the bucket includes a fluid module, a drive module, and a spout. The fluid module includes a mounting frame; a cylinder extending from the mounting frame in a first axial direction along a pump axis; a piston extending through the mounting frame and into the cylinder, the piston configured to reciprocate along the pump axis to pump material from the bucket; and an outlet connector supported by the mounting frame and having an inlet end and an outlet end. The drive module is supported by the fluid module, the drive module including an electric motor operatively connected to the piston to power reciprocation of the piston. The spout extends between a first end having a spout inlet and a second end having a spout outlet, wherein the spout is mounted to the outlet connector by the first end interfacing with the outlet end of the outlet connector, and wherein the spout is repositionable relative to the outlet connector.

According to yet another additional or alternative aspect of the disclosure, a spout for a transfer pump includes a tube extending between an inlet end and an outlet end; an annular groove formed proximate the outlet end; a nozzle mountable to the tube outlet, the nozzle including at least one slot extending therethrough; and a clip configured to extend through the at least one slot and into the annular groove to secure the nozzle to the outlet end.

According to yet another additional or alternative aspect of the disclosure, a transfer pump is configured to pump material from a bucket having an opening and is powered by a battery. The transfer pump includes a fluid module and a drive module supported by the fluid module and having a first side and a second side. The fluid module includes a mounting frame; a cylinder extending from the mounting frame in a first axial direction along a pump axis; a piston extending into the cylinder, the piston configured to reciprocate along the pump axis to pump material from the bucket; and a stand connected to the mounting frame and configured to interface with a ground surface to support the transfer pump on the ground surface. The drive module includes an electric motor operably connected to the piston; a battery mount configured to provide power to the electric motor, the battery mount located on the second side of the drive module; and a drive frame configured to interface with the mounting frame at a static interface. The transfer pump is mountable to the bucket such that the first side of the drive module faces the bucket and a wall of the bucket is disposed radially between the cylinder and the mounting stand. The battery mount is positioned to hold the battery vertically higher than the opening of the bucket but not directly over the opening.

According to yet another additional or alternative aspect of the disclosure, a method of arranging a transfer pump configured to pump material from a bucket includes positioning a fluid module to extend at least partially into the bucket to contact a fluid within the bucket, the fluid module including a piston configured to reciprocate along a pump axis to pump the fluid; and moving a drive module relative to the fluid module while the drive module is mounted on the fluid module and the fluid module remains supported by the bucket, wherein the drive module includes an electric motor operatively connected to the piston to power reciprocation of the piston, and wherein the drive module is structurally supported on the fluid module at the static interface, and the drive module transmits reciprocating mechanical motion to the piston at the dynamic interface.

According to yet another additional or alternative aspect of the disclosure, a method of using a transfer pump to fill a tool with a fluid includes initiating a learning mode session via a user interface on the transfer pump; during the learning mode session, starting actuation of an input of the user interface that causes with transfer pump to power an electric motor of the transfer pump to operate the transfer pump to dispense the fluid into the tool; monitoring volume of dispense of the fluid into the tool; stopping the actuation of the input based on satisfactory with the volume of dispense of the fluid into the tool; ending the learning mode sessions; and actuating a dose input of the user interface to cause the transfer pump to dispense the same volume as dispensed during the learning mode session.

DETAILED DESCRIPTION

This disclosure relates generally to transfer pumps. For example, the transfer pump can be used to pump drywall mud, filler, and other thick fluids. Drywall mud is used in construction applications, such as filling in wall and ceiling gaps (particularly with drywall), smoothing, and creating parts of walls, ceilings, and other structures. Such mud can be mixed on a construction site, such as in a 5 gallon bucket, or can be shipped premade and then opened on site. The mud is pumped from the bucket to a dispensing tool. The dispensing tool then dispenses the mud to an application site, such as walls, ceilings, and other structures, which is typically then smoothed and then dries in place. Such mud is typically composed of water, limestone, expanded perlite, ethylene-vinyl acetate polymer, attapulgite, and other ingredients, amongst other options. It is understood that, while a pump that transfers mud from a bucket will be discussed herein as an exemplar, the pump and other features can be used to transfer other materials and from other types of reservoirs.

Figure 1:
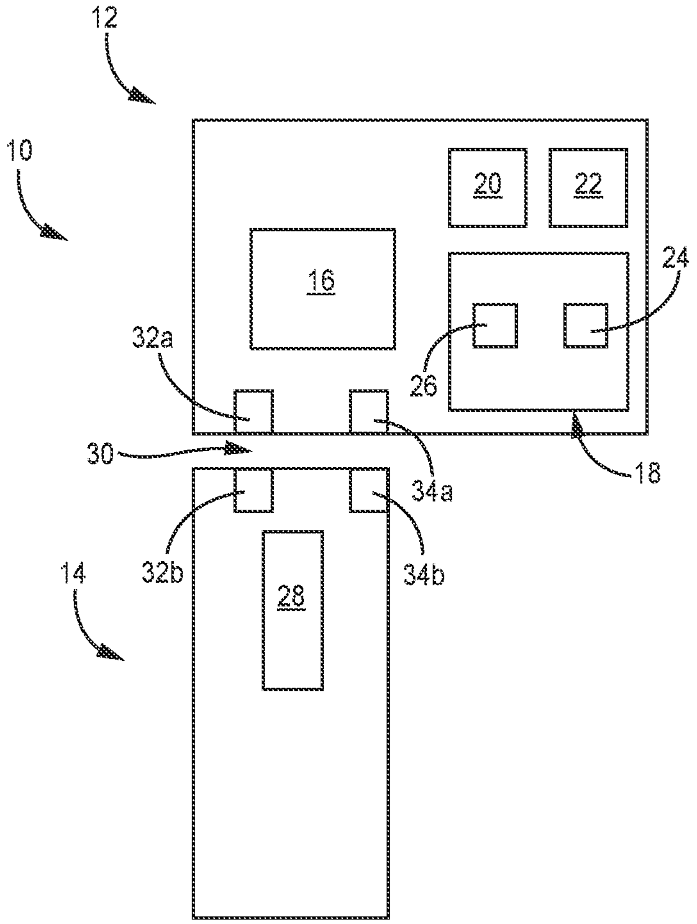
FIG. 1 is a block schematic diagram of a transfer pump assembly.

FIG. 1 is a block schematic diagram of transfer pump 10. Transfer pump 10 includes drive module 12 and fluid module 14. Drive module 12 includes motor 16, control module 18, user interface 20, and power supply 22. Control module 18 includes control circuitry 24 and memory 26. Fluid module 14 includes a fluid displacement member 28.

Transfer pump 10 is configured to transfer fluid, such as mud, from a fluid reservoir, such as a bucket, to a downstream location, such as a dispensing tool. Transfer pump 10 is electrically powered to pump the material. Transfer pump 10 is an electric pump that does not rely on a mechanical input to power pump. Drive module 12 is configured to provide motive power to fluid module 14 to cause fluid module 14 to pump the mud. Transfer pump 10 is configured to output mud at pressures of up to about 8.6 megapascal (MPa) (about 125 pounds per square inch (psi)). In some examples, transfer pump 10 is configured to output mud at pressures between about 0.28 MPa (about 40 psi) to about 0.62 MPa (about 90 psi). In some examples, transfer pump is configured to output mud at pressures between about 0.07 MPa (about 10 psi) to about 0.21 MPa (about 30 psi), although other ranges are possible. In some examples, there is no pressure sensor measuring the output pressure from transfer pump 10. Likewise, in some examples, there is no pressure indicator indicating the output pressure within the pumping system. It is understood, however, that not all embodiments are so limited.

Drive module 12, including the electric components, is separate from fluid module 14 to isolate the electric components from the mud or other fluid. In the example shown, drive module 12 can be removably mounted to fluid module 14. It is understood, however, that in various other examples the drive module 12 and fluid module 14 can be permanently attached such that the transfer pump 10 is an integrated system with the drive module 12 and fluid module 14 representing different sections of that integrated system. Drive module 12 can be structurally supported by fluid module 14. Drive module 12 includes the electronic components of transfer pump 10. In some examples, fluid module 14 does not include electronic components. In some examples, fluid module 14 is not electrically connected to drive module 12. Fluid module 14 is configured to contact the mud or other fluid in the reservoir during pumping, which reservoir can also be referred to as a bucket or material supply, among other options.

Power supply 22 is configured to provide electric power to other components of drive module 12. For example, power supply 22 can include one or more batteries or a cord configured to connect to an electrical outlet to accept power from the electrical outlet. Power supply 22 can also be referred to as a power source.

Motor 16 receives power from power supply 22 and generates a mechanical output to power pumping by fluid module 14. Motor 16 is configured to cause linear reciprocation of piston 28. In some examples, the motor 16 is configured to generate a rotational output, though it is understood that not all examples are so limited. For example, motor 16 can be a linear actuator, such as a solenoid. A conversion drive can be connected to motor 16 to convert the rotational motion output from the motor 16 to a linear reciprocating motion that is provided to piston 28 to drive reciprocation of piston 28, such as an eccentric crank or scotch-yoke, among other options.

Control module 18 is operably connected to motor 16 to control operation of motor 16. For example, control module 18 can be electrically and/or communicatively connected to motor 16. Control module 18 is configured to perform any of the functions discussed herein, including receiving an output from any source referenced herein, detecting any condition or event referenced herein, and controlling operation of transfer pump 10 and components thereof as referenced herein. Control module 18 is configured to store software, implement functionality, and/or process instructions. Control module 18 can be of any suitable configuration for controlling operation of motor 16, gathering data, processing data, etc. Control module 18 can perform any of the electrically based functions referenced herein. Control module 18 may include processing circuitry, which may or may not include a microchip or other type of chip. Control module 18 can receive electric power from power supply 22, such as an electrical outlet or a battery, and can direct electrical power to motor 16.

Control module 18 can include hardware, firmware, and/or stored software. Control module 18 can be of any type suitable for operating in accordance with the techniques described herein. While control module 18 is illustrated as a single unit, it is understood that control module 18 can be disposed across one or more circuit boards. In some examples, control module 18 can be implemented as a plurality of discrete circuity subassemblies.

Control circuitry 24, in one example, is configured to implement functionality and/or process instructions. For example, control circuitry 24 can be capable of processing instructions stored in memory 26. Examples of control circuitry 24 can include one or more of a processor, a microprocessor, a controller, a digital signal processor (DSP), an application specific integrated circuit (ASIC), a field-programmable gate array (FPGA), or other equivalent discrete or integrated logic circuitry.

Memory 26 can be configured to store information before, during, and/or after operation. Memory 26 can be configured to store software that, when executed by control circuitry 24, controls operation of motor 16. In some examples, memory 26 is used to store program instructions for execution by control circuitry 24. Memory 26, in one example, is used by software or applications running on control module 18 to temporarily store information during program execution.

Memory 26, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 26 is a temporary memory, meaning that a primary purpose of memory 26 is not long-term storage. Memory 26, in some examples, is described as volatile memory, meaning that memory 26 does not maintain stored contents when power to transfer pump 10 is turned off. Examples of volatile memories can include random access memories (RAM), dynamic random access memories (DRAM), static random access memories (SRAM), and other forms of volatile memories.

Memory 26, in some examples, also includes one or more computer-readable storage media. Memory 26 can be configured to store larger amounts of information than volatile memory. Memory 26 can further be configured for long-term storage of information. In some examples, memory 26 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 20 can be any graphical and/or mechanical interface that enables user interaction with control module 18. User interface 20 can include one or more actuatable inputs that can be manipulated by the user to provide various inputs to control module 18 to control operation of transfer pump 10. User interface 20 can be utilized to cause control module 18 to power motor 16 to operate transfer pump 10. User interface 20 can include one or more buttons, dials, touchscreens, or other way to input instructions, such as to the control circuitry 24. For example, actuating the input (e.g., by pressing a button) can cause the control circuitry 24 to power on the motor 16 to operate transfer pump 10.

Transfer pump 10 may operate to pump so long as the input is engaged, whereby release of the input powers down the motor 16.

In some examples, user interface 20 can implement a graphical user interface displayed at a display device of user interface 20 for presenting information to and/or receiving input from a user. User interface 20 can be configured as an input and/or output device to receive information from the user and provide information to the user. Some examples of user interface 20 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users or machines. User interface 20, in some examples, includes physical navigation and control elements, such as physically actuated buttons or other physical navigation and control elements. In general, user interface 20 can include any input and/or output devices and control elements that can enable user interaction with control module 18.

Drive module 12 is configured to mount to fluid module 14 at coupling 30. Drive module 12 is structurally supported by fluid module 14 at coupling 30 and drive module 12 provides mechanical reciprocating motion to power pumping by fluid module 14. While the fluid module 14 is described as including a piston 28, it is understood that fluid module 14 can include any desired reciprocating, fluid moving component, such as a piston, diaphragm, or one formed of any other desired configuration. Drive module 12 can provide the mechanical reciprocating motion to power reciprocation of piston 28 at coupling 30. Coupling 30 includes a dynamic connection interface and a static connection interface. Fluid module 14 is mechanically connected to drive module 12 at coupling 30. The dynamic interface and the static interface facilitate mounting of drive module 12 to fluid module 14 such that drive module 12 is supported by fluid module 14 and can provide motive power to fluid module 14 to power pumping by fluid module 14. Drive module 12 can be separated from fluid module 14, such as by breaking the static and dynamic interfaces that form coupling 30, without breaking any electrical connections.

The dynamic interface is formed by a connection between a dynamic component 32*a* of drive module 12 and a dynamic component 32*b* of fluid module 14. Drive module 12 provides motive power to fluid module 14 by the dynamic interface. For example, piston 28 can form the dynamic component 32*b* of fluid module 14 that interfaces with a reciprocating member of drive module 12 that forms the dynamic component 32*a* of drive module. The piston 28 can be connected to the reciprocating member by a slotted interface, pinned interface, or in any other desired connection manner.

The static interface is formed by a connection between a static component 34*a* of drive module 12, such as a support frame of drive module 12, and a static component 34*b* of fluid module 14, such as a support frame of fluid module 14. Drive module 12 can be structurally supported by the fluid module 14 at the static interface. Drive module 12 can be secured to fluid module 14 at the static interface to prevent dismounting of drive module 12 from fluid module 14.

During operation, control module 18 controls operation of motor 16 to control pumping by transfer pump 10. The user can cause transfer pump 10 to pump mud by providing a dispense command via user interface 20. For example, the user can input the dispense command by depressing a button of user interface 20. In some examples, control module 18 is configured to cause motor 16 to operate so long as the pump command is being provided (e.g., so long as the user continues to depress the button). Releasing the button can cause the control module 18 to remove power from motor 16 to stop pumping by transfer pump 10.

The user can input commands to control module 18 and provide instructions to control module 18 via user interface 20. The user can operate transfer pump by providing an input to the control module via the user interface, such as by pressing a button of the user interface. Pressing the button can cause the control module to provide power to motor 16 to operate the transfer pump 10 and cause pumping by the transfer pump 10. The transfer pump 10 can operate so long as the input is being provided, whereby removing the input can power down the motor 16.

Control module 18 can be configured to cause transfer pump 10 to output predetermined volumes of material. Control module 18 can thereby cause transfer pump 10 to operate in a dosing mode. Dosing, as used herein, refers to pumping a predetermined amount of mud or other fluid by the transfer pump 10. For example, the predetermined amount can correspond with the volume of a mud dispensing tool or a desired amount that the user wants to load into a mud dispensing tool.

The user can provide a dosing command to control module 18 via user interface 20. For example, a first button of user interface 20 can be configured to provide the pump command and a second button of user interface 20 can be configured to provide the dosing command. The control module 18 provides power to motor 16 to cause motor 16 to operate to cause transfer pump 10 to output the predetermined volume. During dosing, the user can provide a single input to control module 18 to cause control module 18 to output the predetermined volume. For example, the user can depress and release the dosing input (e.g., button) and control module 18 can then operate the motor 16 to cause transfer pump 10 to output the predetermined volume. Control module 18 can determine the predetermined volume based on an operating parameter, such as rotations of motor 16, cycles of piston 28, duration of motor operation, a number of motor pulses, among other options. The operating parameter can be speed and power independent such that the speed of rotation of motor 16 and the amount of power provided to motor 16 do not affect the parameter. For example, the predetermined volume can be associated with a number of motor pulses. Control module 18 can count the motor pulses and determine that the predetermined volume has been dispensed based on the actual count of motor pulses reaching the number of motor pulses associated with the predetermined volume.

One or more predetermined dosing volumes can be stored in memory 26. The user can select the desired predetermined dosing volume via user interface 20. In some examples, control module 18 can be programmed to operate motor 16 to pump a predetermined volume of material by way of user interface 20. For example, the user can use user interface 20 to input a particular dosage amount. The user can then use user interface 20 to provide a dosing command to control module 18 to cause transfer pump 10 to output the predetermined volume. That way, the user can approach transfer pump 10, fit the mud dispensing tool to an output of transfer pump 10, press a single button, and receive the desired dose of mud. When the dosing command is provided, the control module 18 can cause the transfer pump 10 to output just the dosage amount in a continuous operation of the motor 16.

In some examples, control module 18 can be configured to learn the dispense volume that is then stored as the dosing volume. For example, the user may hit a button or other input of user interface 20 to cause control module 18 to enter a learning mode. In the learning mode, control module 18 monitors an operating parameter of transfer pump 10, such as the duration of motor operation, number of motor revolutions, number of motor pulses, or other parameter, while the user manually depresses a button or other input that operates the motor 16 so that the transfer pump 10 pumps. The user releases the button or other input, disengaging the motor 16 when the desired dose has been delivered. The control module 18 can save the operating parameter as a dosing parameter. In subsequent dispense sessions, a single selection of a button or other input of user interface 20 can cause the control module 18 to operate the motor according to the dosing parameter, such as for the same duration, number of motor revolutions, or number of motor pulses, among others. In this way, the user can dynamically set predetermined volumes as the dosing volumes according to the particular requirements of the equipment being used or the job being performed.

Control module 18 can be configured to cause transfer pump 10 to operate in a continuous dispense mode. In the continuous dispense mode, control module 18 causes motor 16 to continuously operate until a stop dispense command is provided to control module 18. Operating transfer pump 10 in the continuous dispense mode facilitates transfers of bulk material as well as cleaning and flushing of transfer pump 10.

During operation, fluid module 14 is placed in contact with the mud. Power is provided to motor 16 from power supply 22 to operate motor 16. Motor 16 causes reciprocating, linear motion of piston 28 to cause piston 28 to pump the mud. The fluid travels through portions of fluid module 14 and is output from fluid module 14. The mud does not contact or flow through portions of drive module 12.

Figure 2A:
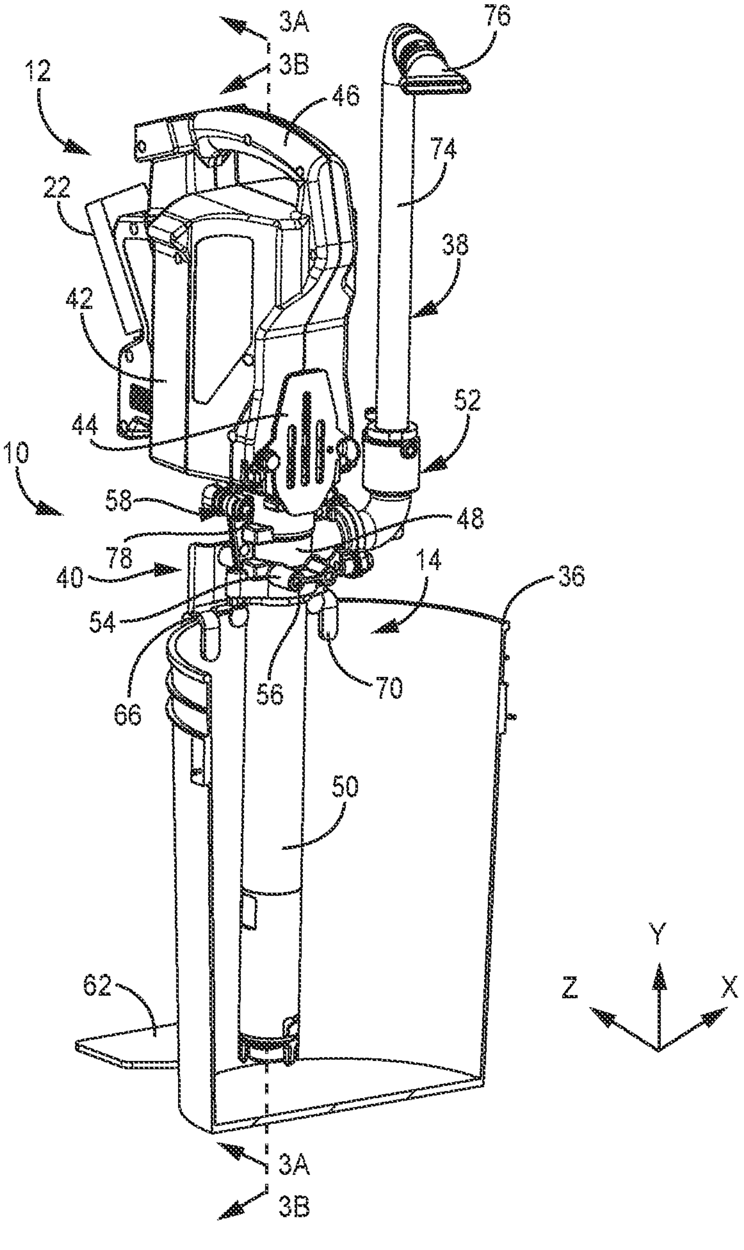
FIG. 2A is an isometric view of a transfer pump mounted to a bucket.
Figure 2B:
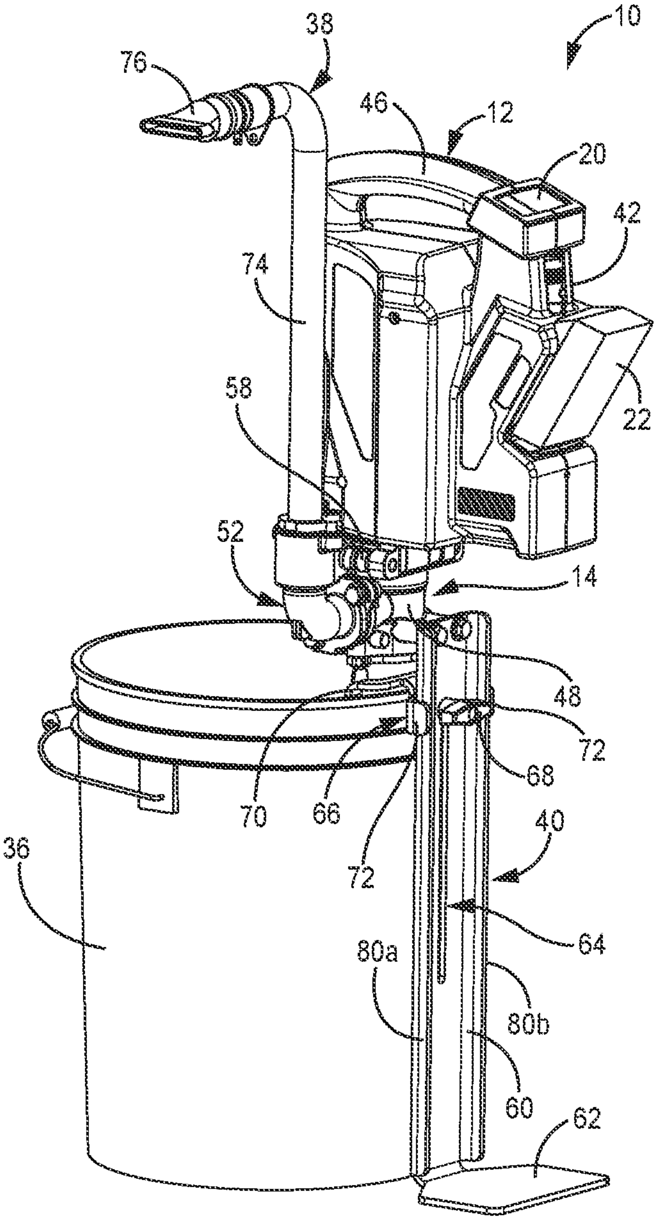
FIG. 2B is a second isometric view of the transfer pump.
Figure 2C:
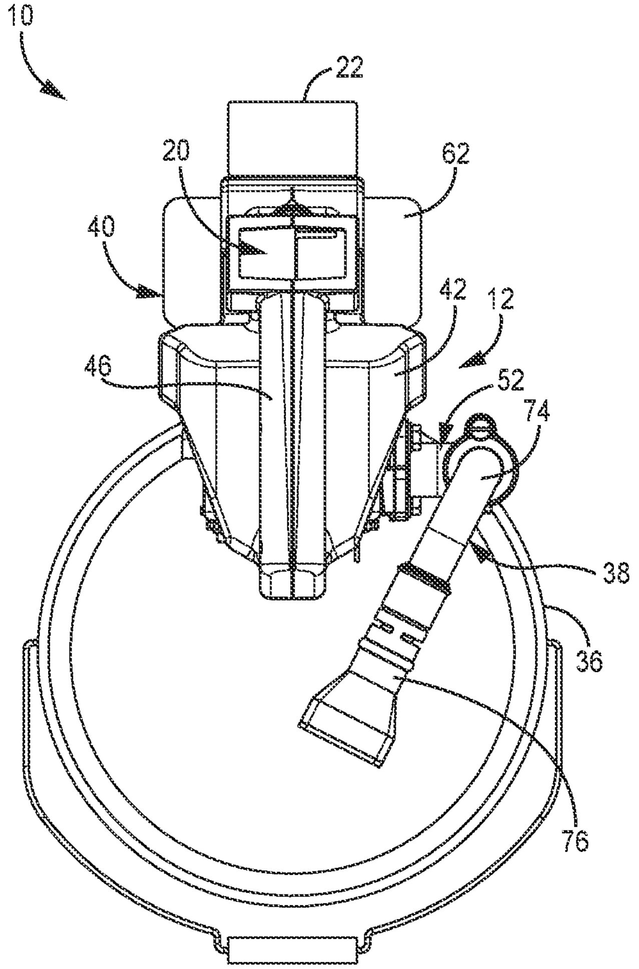
FIG. 2C is a top plan view of the transfer pump.

FIG. 2A is an isometric view of transfer pump 10 and bucket 36, which is shown in cross-section. FIG. 2B is a second isometric view of transfer pump 10 and bucket 36. FIG. 2C is a top plan view of transfer pump 10 and bucket 36. FIGS. 2A-2C will be discussed together. Drive module 12, fluid module 14, spout 38, and stand 40 of transfer pump 10 are shown. User interface 20, power supply 22, drive housing 42, and door 44 of drive module 12 are shown. Drive housing 42 includes handle 46. Mounting frame 48, cylinder 50, and outlet connector 52 of fluid module 14 are shown. Mounting frame 48 includes stand mount 54, support openings 56, and receivers 58. Stand 40 includes leg 60, foot 62, slot 64, bracket 66, and knob 68. Bracket 66 includes hooks 70 and guide wings 72. Spout 38 includes tube 74 and nozzle 76.

Transfer pump 10 is configured to draw mud or other fluid from bucket 36 and output the material through nozzle 76. Drive module 12 contains all of the electrical components of transfer pump 10. Drive module 12 does not contact the mud or other material during operation. Fluid module 14 is the only portion of transfer pump 10 that contacts the mud or other material. A portion of fluid module 14 extends into bucket 36 and can extend into the mud in bucket 36. The portion of fluid module 14 can be at least partially submerged in the mud within bucket 36. In the example shown, cylinder 50 extends into bucket 36 and is configured to contact the mud within bucket 36. Cylinder 50 can be sized to be inserted into bucket 36 through a smaller opening than the top opening of bucket 36. For example, the outer diameter of cylinder 50 is less than about 4.83 centimeters (cm) (about 1.9 inches (in)). Sizing cylinder 50 in this way allows cylinder 50 to be inserted through a tint hole of a standard bucket 36.

Mounting frame 48 is connected to other components of transfer pump 10 to support other components of transfer pump 10. Drive module 12, cylinder 50, outlet connector 52, and spout 38 are each directly or indirectly structurally supported by mounting frame 48.

Receivers 58 form a part of the static connection between drive module 12 and fluid module 14. In the example shown, receivers 58 project from mounting frame 48. Receivers 58 extend from opposite sides of mounting frame 48 to facilitate mounting of drive module 12 at different orientations relative to fluid module 14. In some examples, multiple receivers 58 can be disposed on the same horizontal (X-Y) plane. In some examples, each receiver 58 is disposed on the same horizontal plane such that the horizontal plane passes through at least a portion of each receiver 58.

Figure 5A:
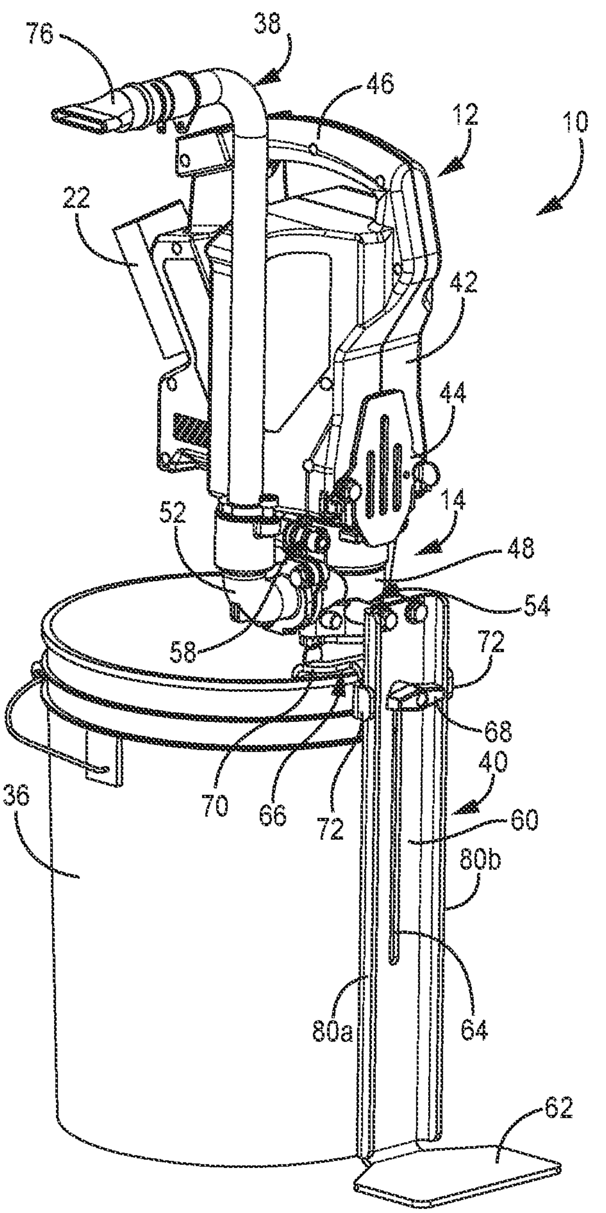
FIG. 5A is an isometric view of a transfer pump with a drive module mounted in a second position.
Figure 5B:
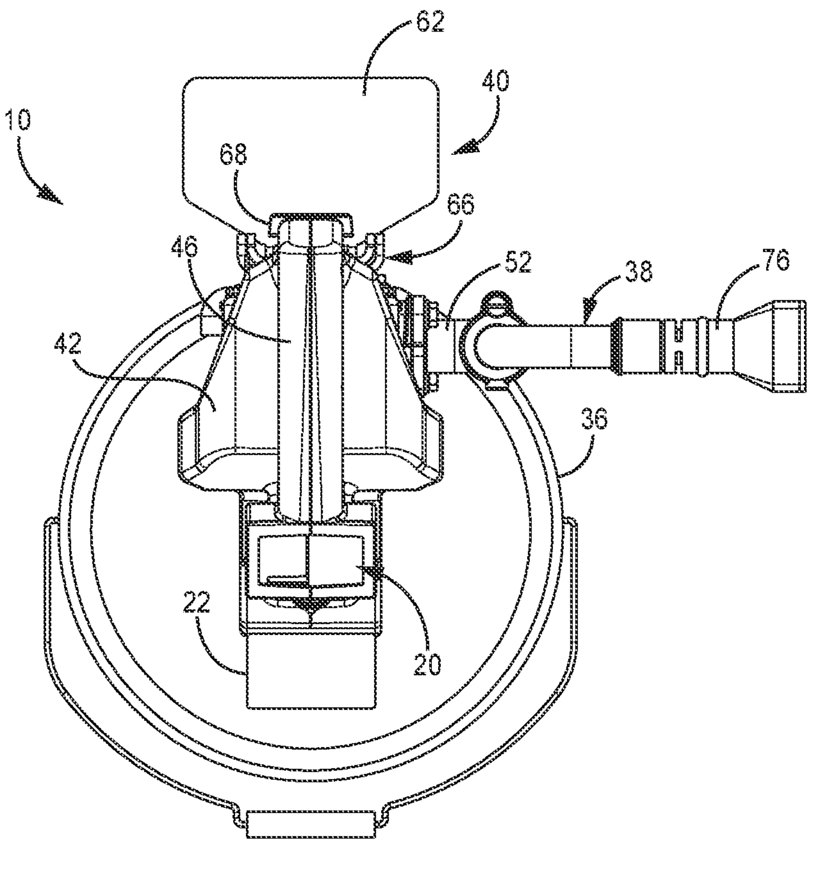
FIG. 5B is a top plan view of the transfer pump shown in FIG. 5A.

Each receiver 58 includes at least one receiving opening 78 to receive a post extending from drive module 12. In the example shown, bore extend fully through each receiver 58 such that receiving openings 78 at each end of each receiver 58 are associated with a common bore. Receivers 58 can accept the posts from either side of the receiver 58 to facilitate mounting of drive module 12 to fluid module 14 in multiple orientations. The first and second sets of receiving openings 78 on the opposite sides of each receiver 58 can be mirror images of each other. While mounting frame 48 is shown as including two receivers 58, it is understood that other numbers of receivers 58 can form a set, such as one, three, four, etc. As discussed in more detail below, drive module 12 can be mounted to a first side of receivers 58 to position drive module 12 outside of the footprint of bucket 36 (e.g., as shown in FIGS. 2A-2C). In such a state, most or all of drive module 12 is not disposed over the opening of bucket 36 and is instead disposed radially outside of the opening of bucket 36. Drive module 12 can be mounted to the second side of receivers 58 to position all or most of drive module 12 over the opening of bucket 36, reducing the footprint of transfer pump 10 (e.g., as shown in FIGS. 5A and 5B).

Figure 3A:
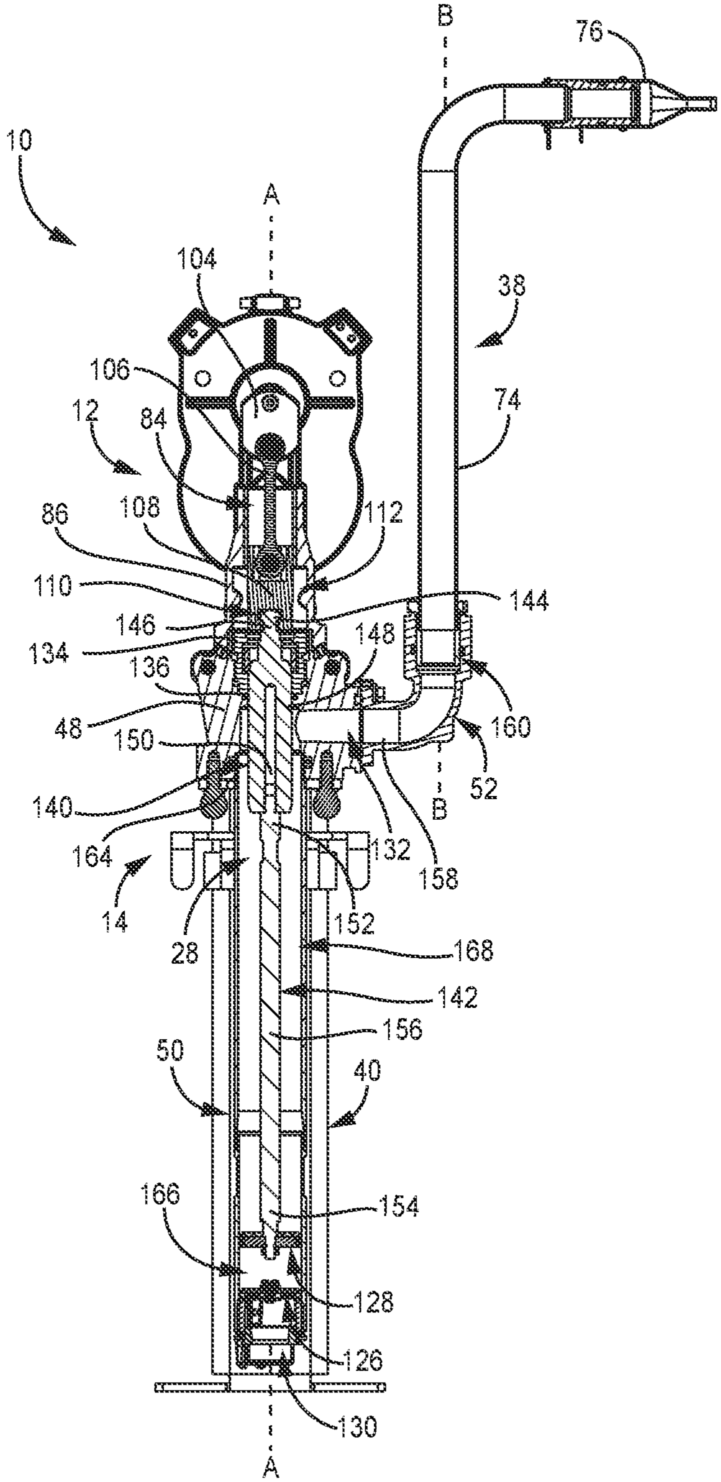
FIG. 3A is a cross-sectional view of a transfer pump taken along line 3A-3A in FIG. 2A.
Figure 3B:
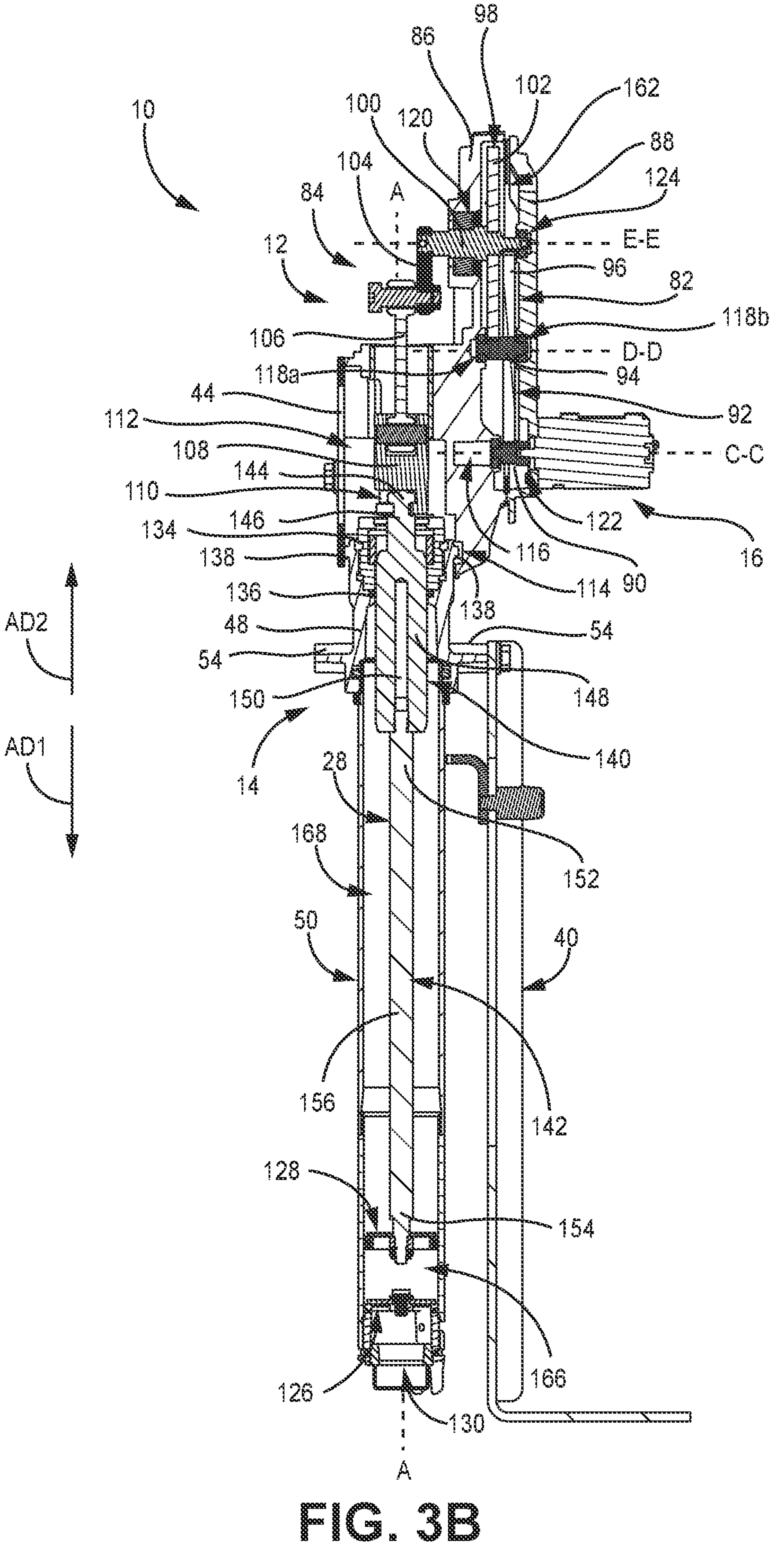
FIG. 3B is a cross-sectional view of a transfer pump taken along line 3B-3B in FIG. 2A.

A portion of the fluid path through fluid module 14 is formed through mounting frame 48. Cylinder 50 extends from mounting frame 48 into bucket 36. Cylinder 50 can be attached to mounting frame 48, such as by fasteners, such as wingnuts, among other options. Cylinder 50 is elongate along a pump axis A-A (FIGS. 3A and 3B). A fluid displacement member of fluid module 14, such as piston 28 (best seen in FIGS. 3A and 3B), extends from within cylinder 50 and through mounting frame 48 to interface with drive module 12 at the dynamic interface. The piston 28 can reciprocate on the pump axis A-A to pump the material.

An outlet of transfer pump 10 is formed through mounting frame 48. Outlet connector 52 is connected to mounting frame 48 at the pump outlet. Outlet connector 52 can be rigidly connected to mounting frame 48, such as by fasteners, such as bolts, among other options. Outlet connector 52 is connected to mounting frame 48 to receive the material output from fluid module 14 and is configured to provide that material to spout 38. Outlet connector 52 is disposed circumferentially between the first and second stand mounts 54. Outlet connector 52 is mounted to a third side of mounting frame 48 different than the first side and the second side that the stand mounts 54 extend from.

Spout 38 is removably mounted to an outlet end of outlet connector 52. Nozzle 76 is disposed at an opposite end of spout 38 from outlet connector 52. In the example shown, tube 74 is mounted to outlet connector 52 and nozzle 76 is mounted to tube 74. In the example shown, nozzle 76 has a duckbill configuration with two relatively longer sides and two relatively shorter sides defining the outlet opening through which the mud exits nozzle 76. Nozzle 76 is configured to interface with the inlet of a mud dispensing tool. As discussed in more detail below, spout 38 is mounted to outlet connector 52 such that spout 38 can be repositioned relative to outlet connector 52 while mounted. In some examples, spout 38 is rotatable and can be rotated about axis B-B (best seen in FIG. 3A) to change a relative orientation of nozzle 76. As shown in FIG. 2C, spout 38 can be positioned such that nozzle 76 is disposed over the opening of bucket 36. Spout 38 can be positioned such that nozzle 76 is oriented outward (FIG. 2B) during filling of a mud dispensing tool and then spout 38 can be rotated inward such that nozzle 76 is disposed over bucket 36 (FIG. 2C) when not dispensing mud (e.g., between fills). Positioning nozzle 76 over bucket 36 ensures that any dripping or leakage of material from nozzle 76 is captured by bucket 36. Nozzle 76 can thus be positioned in a more convenient location during pumping (e.g., outward) and positioned in a different location when not pumping (e.g., inward) to prevent spillage and mess on site.

Stand 40 is connected to transfer pump 10 to support and stabilize transfer pump 10. Stand 40 is directly connected to fluid module 14. More specifically, leg 60 is connected to mounting frame 48. Stand 40 extends downwards towards the ground surface from mounting frame 48. Leg 60 forms a vertical portion of stand 40 and foot 62 forms a horizontal portion of stand 40. Foot 62 extends from a bottom end of leg 60. Foot 62 can contact the ground surface to stabilize transfer pump 10 and support transfer pump 10 on the ground surface. Leg 60 and foot 62 are disposed outside of bucket 36 while cylinder 50 is disposed within bucket 36. In this way, mounting frame 48 straddles (and may engage) the annular lip of the bucket 36. Transfer pump 10 can support itself freestanding on the bucket 36 in this manner. For example, the transfer pump 10 can operate to pump while supported only by the foot 62 and the bucket 36. In the example shown, foot 62 is disposed fully outside of a footprint of the bucket 36. Foot 62 is not disposed between the bucket 36 and the ground surface. In some examples, foot 62, or a portion thereof, can extend underneath bucket 36 such that a portion of foot 62 is within the footprint of bucket 36. As such, the bucket 36 and any material therein can further stabilize transfer pump 10. In some examples, foot 62 can be formed by multiple feet. For example, a first foot 62 can be disposed outward of the footprint of bucket 36 and a second foot 62 can be disposed within the footprint of bucket 36, such as at least partially under bucket 36. In some examples, foot 62 can extend annularly around a base of the leg 60.

Slot 64 is formed in the leg 60. Slot 64 is disposed between lateral sides 80*a*, 80*b* of leg 60. Bracket 66 is connected to stand 40 at slot 64. Knob 68 is disposed on an opposite side of leg 60 from bracket 66 and is connected to bracket 66 by a component, such as a fastener, extending through slot 64. Knob 68 and bracket 66 form an assembly for contacting and interfacing with bucket 36 such that transfer pump 10 is at least partially supported by bucket 36. Hooks 70 extend over the annular lip of bucket 36 to engage with that annular lip. Guide wings 72 wrap around lateral sides 80*a*, 80*b* of leg 60 to orient bracket 66 relative leg 60 and lock the orientation of bracket 66 relative to leg 60. Knob 68 can be rotated in a first direction (one of clockwise and counterclockwise) to fix bracket 66 at a vertical position relative leg 60. Knob 68 can be rotated in a second direction opposite the first direction to loosen bracket 66 such that bracket 66 can be shifted vertically along slot 64 and relative to leg 60. Bracket 66 can thereby be engaged with various types of buckets having varying dimensions, such as different heights.

The interface between transfer pump 10 and bucket 36 can secure bucket 36 to transfer pump 10. In some examples, the interface between stand 40 and bucket 36 can secure bucket 36 to transfer pump 10. For example, knob 68 and bracket 66 can secure bucket 36 and stand 40 together such that lifting transfer pump 10 also lifts bucket 36 and associated mud within bucket 36. In some examples, a support component can be formed on or by a portion of transfer pump 10 to support bucket 36 relative to transfer pump 10 when transfer pump 10 is lifted by handle 46. For example, a hook can project from a portion of transfer pump 10, such as from mounting frame 48. The hook can be positioned such that a handle of bucket extends over and is supported by the hook when transfer pump 10 is lifted. The bucket 36 can be lifted by transfer pump 10 by the support component interfacing with the handle of bucket 36.

Stand 40 is connected to mounting frame at stand mount 54. Stand mounts 54 extend from mounting frame 48. Stand mounts 54 can include cylindrical projections extending from mounting frame 48, though other shapes are possible. In some examples, the projections forming the stand mounts 54 can be disposed on the same horizontal (X-Z) plane. In some examples, each stand mount 54 is disposed on the same horizontal plane such that the horizontal plane passes through at least a portion of each stand mount 54. Support openings 56 extend into the posts forming stand mounts 54. Support openings 56 are configured to receive fasteners to attach stand 40 to transfer pump 10. For example, support openings 56 can be threaded to receive threaded fasteners. In the example shown, each stand mount 54 is formed by sets of posts, such as pairs. Each set of posts can include one or more walls extending between and connecting the individual posts to further support the pairs of posts forming stand mounts 54 relative to each other. In the example shown, a first stand mount 54 extends from a first side of mounting frame 48 and a second stand mount 54 extends from a second, opposite side of mounting frame 48. The first and second stand mounts 54 can be mirror images of each other. While each stand mount 54 is shown as including two posts, it is understood that other numbers of posts can form each stand mount 54, such as one, three, four, etc. Further, while transfer pump 10 is described as including two stand mounts 54, it is understood that mounting frame 48 can have a single stand mount 54 or more than two stand mounts 54. For example, a third stand mount 54 can extend from a fourth side of mounting frame 48 opposite the side of mounting frame 48 that outlet connector 52 is mounted to. The third stand mount 54 can be disposed circumferentially between the first stand mount 54 and the second stand mount 54.

Fasteners extend through stand 40 and into support openings 56 to secure stand 40 to transfer pump 10. Stand mounts 54 facilitate mounting of stand 40 to transfer pump 10 in different orientations. In a first orientation, as shown, outlet connector 52 is disposed on a first lateral side of stand 40, such as to the relative right of stand 40 when viewed from behind stand 40 towards bucket 36. The fasteners can be removed to detach stand 40 from mounting frame 48. Stand 40 can be aligned with the opposite stand mount 54 to change a relative orientation of the outlet of fluid module 14. When stand 40 is mounted to the opposite stand mount 54, outlet connector 52 is disposed on the other lateral side of stand 40, such as to the relative left of stand 40 when viewed from behind stand 40 towards bucket 36. Stand 40 can be mounted to opposite sides of mounting frame 48 as desired by the user to facilitate carrying and shifting of transfer pump 10 around a job site. For example, stand 40 can be mounted at different positions to facilitate right-hand vs. left-hand carrying of transfer pump 10.

In the example shown, drive module 12 is removably mounted to fluid module 14. Drive module 12 is supported vertically above fluid module 14. Drive module 12 is supported by fluid module 14 such that all of drive module 12 is disposed vertically above bucket 36. As such, no part of drive module 12 overlaps vertically with any portion of bucket 36. As such, a horizontal plane that extends through bucket 36 does not extend through drive module 12. All components of drive module 12 are elevated above the maximum fluid level within bucket 36. Drive housing 42 encloses various other components of drive module 12, such as motor 16. In some examples, drive housing 42 can be a clamshell housing that encloses various components of drive module 12. Drive housing 42 can be formed from a polymer or a metal, among other options. As discussed in more detail below, drive module 12 is mounted to fluid module 14 at a static connection at least partially formed by receivers 58 of mounting frame 48. While drive module 12 and fluid module 14 are described as separable components, it is understood that in various examples the drive module 12 and fluid module 14 can be permanently attached such that the transfer pump 10 is an integrated system with the drive module 12 and fluid module 14 representing different sections of that integrated system.

Handle 46 is formed on a top side of drive housing 42. Handle 46 is configured to be grasped by a hand of the user. The user can, in some examples, grasp handle 46 to pick up and transport transfer pump 10 and bucket 36 simultaneously. A user can pick up and carry transfer pump 10 by grasping handle 46 with a single hand of the user. A center of gravity of transfer pump 10 can extend through handle 46 to facilitate carrying and transport of transfer pump 10.

Door 44 is disposed on drive housing 42 and covers a receiving chamber within which the dynamic connection between drive module 12 and fluid module 14 is formed. Door 44 is movable to expose the receiving chamber and allow for connecting and disconnecting drive module 12 and fluid module 14.

User interface 20 is formed on drive housing 42. User interface 20 is formed on a top of drive housing 42 proximate power supply 22. In the example shown, user interface 20 is disposed vertically above the battery forming power supply 22. User interface 20 is disposed at a rear end of handle 46 on an opposite end of drive housing 42 from the receiving chamber covered by door 44. User interface 20 is disposed radially between handle 46 and power supply 22 relative to pump axis A-A. In the example shown, handle 46, user interface 20, and power supply 22 are aligned on a radial line extending from pump axis A-A. The radial line can extend a full length of handle 46 between the front and rear ends of the handle 46. The power supply 22 is positioned vertically higher than the bucket 36. As best seen in FIG. 2C, power supply 22 is disposed radially outside of the footprint of bucket 36 with drive module 12 mounted on the same side of mounting frame 48 as stand 40. During operation, users may refill bucket 36 with additional material to continue using the same pump arrangement without having to switch buckets 36. Power supply 22 being disposed outside of the footprint of bucket 36 prevents inadvertent pouring of fluid onto power supply 22 as bucket 36 is refilled.

In various embodiments, the power supply 22 includes a modular battery pack that can be mounted to a battery mount fixed to the transfer pump 10. For example, the battery mount can be fixed to the drive module 12 portion of the transfer pump 10. The modular battery pack supplies electrical power to the electric motor 16 via the battery mount. The modular battery pack can be detached from the battery mount for recharging of the modular battery pack. As shown, the battery mount is on the exterior of the transfer pump 10 such that the modular battery pack is directly exposed to atmosphere. For example, the modular battery pack is not contained behind a door or located inside of any housing. The battery mount is positioned away from the outside of the footprint of bucket 36 so that the module battery pack will not accidently fall into the bucket which is most circumstances would ruin the module battery pack and the fluid in the bucket.

The drive module 12 includes a first side and a second side opposite the first side. The first side of the drive module 12 faces the bucket 36 while the power supply 22 and/or the user interface 20 are located on the second side of the drive module 12.

Transfer pump 10 does not rely on a mechanical input to power transfer pump 10. Rather, transfer pump 10 is electrically powered by power supply 22. In the example shown, power supply 22 is a battery mounted to drive housing 42. The battery is mounted on a rear side of drive housing 42. The battery is disposed on the rear side, opposite the side through which fluid module 14 is dynamically connected to drive module 12. The battery is positioned vertically below handle 46. In the example shown, the battery is mounted at an angle relative to a pump axis A-A. The battery can slide upwards and radially away from bucket 36 and pump axis A-A during removal and downwards and radially towards bucket 36 and pump axis A-A during mounting. The orientation of power supply 22 facilitates quick mounting and dismounting of the battery, minimizing downtime, and providing increased efficiencies.

The separability of drive module 12 and fluid module 14 allows the material-contacting fluid module 14 to be separately and easily cleaned without concern for wetting electrical components of drive module 12. Moreover, the relatively more expensive drive module 12, when compared to the electronics-free fluid module 14, can be separately and securely stored when transfer pump 10 is not in use. A user can also have multiple fluid modules 14 across various job sites and utilize one or more separable drive modules 12 to power the fluid modules 14. As such, the user needs to transport only the drive module 12 between job sites. Drive module 12 and fluid module 14 thereby provide reduced costs and facilitate quick and easy transport between job sites and within a job site.

FIG. 3A is a cross-sectional view of transfer pump 10 taken along line 3A-3A in FIG. 2A. FIG. 3B is a cross-sectional view of transfer pump 10 taken along line 3B-3B in FIG. 2A. Drive housing 42 is removed for clarity in each of FIGS. 3A and 3B. Transfer pump 10 includes drive module 12, fluid module 14, and spout 38.

Motor 16, door 44, gearing 82, crank 84, drive frame 86, and drive plate 88 of drive module 12 are shown. Motor 16 includes motor pinion 90. Gearing 82 includes first stage 92 having first stage pinion 94 and first gear wheel 96 and second stage 98 having second stage shaft 100 and second gear wheel 102. Crank 84 includes eccentric 104, arm 106, and drive link 108. Drive link 108 includes receiving slot 110. Drive cavity 112, recess 114, motor bore 116, first stage bore 118*a*, and second stage opening 120 of drive frame 86 are shown. Drive plate 88 includes first stage bore 118*b*, motor opening 122, and second stage bore 124.

Piston 28, mounting frame 48, cylinder 50, outlet connector 52, inlet check valve 126, traveling check valve 128, pump inlet 130, pump outlet 132, seal nut 134, and upper seal 136 of fluid module 14 are shown. Stand mount 54 and braces 138 of mounting frame 48 are shown. Piston 28 includes upper piston portion 140 and lower piston portion 142. Upper piston portion 140 includes head 144, neck 146, upper body 148, and connection bore 150. Lower piston portion 142 includes upper end 152, lower end 154, and lower body 156. Inlet end 158 and outlet end 160 of outlet connector 52 are shown. Tube 74 and nozzle 76 of spout 38 are shown.

Drive module 12 is mounted to fluid module 14 such that drive module 12 is structurally supported by fluid module 14 and such that drive module 12 drives reciprocation of piston 28 of fluid module 14 to cause pumping. Drive frame 86 is connected to mounting frame 48 by a static connection, as discussed in more detail below. Fluid module 14 supports drive module 12 by the static connection. Motor 16 is connected to piston 28 by a dynamic connection to drive reciprocation of piston 28, as discussed in more detail below. Drive module 12 powers pumping by transfer pump 10 by the dynamic connection.

Motor 16 is configured receive electric power from power supply 22 (FIGS. 1-2C) and generates a mechanical output to cause pumping by fluid module 14. Motor 16 is an electric motor 16, such as a brushed or brushless direct current (DC) motor or alternating current (AC) induction motor, among other options.

Drive plate 88 is connected to drive frame 86 to define gear cavity 162 within which gearing 82 is at least partially disposed. Drive plate 88 supports motor 16, first stage 92, and second stage 98. Motor 16 is mounted to a rear side of drive plate 88. Motor 16 is cantilevered from drive plate 88 in a direction away from drive cavity 112. Motor 16 is cantilevered away from pump axis A-A. A portion of motor 16 extends through motor opening 122 in drive plate 88 into the gear cavity 162. Motor pinion 90 is supported by a bearing disposed in motor bore 116 of drive frame 86. Motor pinion 90 interfaces with first gear wheel 96 to provide motive power to gearing 82. Motor 16 is disposed on axis C-C such that motor pinion 90 rotates coaxially with axis C-C.

Gearing 82 is a two-stage speed reduction gear system configured to receive a rotational output from motor 16 and provide a rotational output to crank 84 to drive reciprocation of piston 28. Gearing 82 is configured to reduce rotational speed and increase torque.

First stage 92 is disposed fully within gear cavity 162. First stage pinion 94 is supported by a first bearing disposed in first stage bore 118*a* formed in drive frame 86 and a second bearing disposed in first stage bore 118*b* formed in drive plate 88. First stage pinion 94 interfaces with second gear wheel 102 to drive rotation of second stage 98. First stage 92 is disposed on axis D-D such that first stage 92 rotates coaxially with axis D-D.

Second stage 98 is disposed at least partially within gear cavity 162. Second stage shaft 100 is supported by a first bearing disposed in second stage opening 120 in drive frame 86 and a second bearing in second stage bore 124 of drive plate 88. Second stage shaft 100 extends though second stage opening 120 and out of drive frame 86. Second stage 98 is disposed on axis E-E such that second stage 98 rotates coaxially with axis E-E.

The rotational axis C-C of motor 16 is transverse to pump axis A-A. The rotational axis C-C of motor 16 can be orthogonal to pump axis A-A. The rotational axis D-D of first stage 92 is transverse to pump axis A-A. The rotational axis D-D of first stage 92 can be orthogonal to pump axis A-A. The rotational axis E-E of second stage 98 is transverse to pump axis A-A. The rotational axis E-E of second stage 98 can be orthogonal to pump axis A-A. The rotational axis C-C of motor is disposed vertically below the axes D-D and E-E. The rotational axis C-C is spaced in second axial direction AD2 relative to mounting frame 48 while cylinder 50 extends in first axial direction AD1 relative to mounting frame 48. Motor 16 is disposed axially between fluid module 14 and gearing 82 along pump axis A-A. Motor 16 is disposed vertically above mounting frame 48. During at least a portion of each pump cycle, motor 16 is disposed vertically above both the dynamic interface between piston 28 and drive link 108 and the static interface between mounting frame 48 and drive frame 86. In some examples, axis C-C is disposed vertically above the dynamic interface and the static interface throughout operation. In some examples, a portion of transfer pump 10 forming the dynamic interface (e.g., the head 144 of piston 28) can intersect with or be disposed vertically above axis C-C, such as when eccentric 104 is at a top dead center position. The stepwise arrangement of the various rotational axes of motor 16 facilitates a compact mounting arrangement and slim profile for drive module 12.

Crank 84 is connected to gearing 82. Crank 84 receives a rotational output from gearing 82 and translates the rotational output into a linear reciprocating motion of drive link 108. In the example shown, eccentric 104 is directly connected to second stage shaft 100. Arm 106 extends between and is connected to eccentric 104 and drive link 108. Rotation of eccentric 104 about axis E-E causes linear, reciprocating motion of drive link 108 along pump axis A-A.

Drive link 108 is at least partially disposed within drive cavity 112. Receiving slot 110 is formed in drive link 108 and configured to receive head 144 of piston 28. Receiving slot 110 is open at a front end to allow insertion and removal of head 144 in a radial direction relative to pump axis A-A and is open at a lower end to allow piston 28 to extend therethrough. Head 144 is retained within receiving slot 110 by a flange disposed around the lower opening of receiving slot 110 and interfacing with a lower side of head 144. The connection between head 144 and drive link 108 forms the dynamic interface between drive module 12 and fluid module 14.

Door 44 is configured to cover the front opening of drive cavity 112. Brace 138 extends from mounting frame 48 and is disposed between receiving openings 78. Mounting frame 48 can include braces 138 between each set of receiving openings 78. Door 44 can interface with brace 138 with door 44 in the closed state to secure the static connection and lock drive module 12 and fluid module 14 together. The brace 138 on the opposite side of mounting frame 48 from the brace 138 interfacing with door 44 is extends into recess 114.

Fluid module 14 is configured to contact and pump the mud. Piston 28 is at least partially disposed within cylinder 50 and extends through mounting frame 48 and out of the upper end of mounting frame 48 to connect with drive link 108. Piston 28 axially overlaps with a full axial length of mounting frame 48 (taken along axis A-A) throughout operation. Piston 28 partially overlaps with the axial length of cylinder 50 throughout operation. The axial overlap between piston 28 and cylinder 50 varies throughout operation while the axial overlap between piston 28 and mounting frame 48 remains constant.

Piston 28 includes upper piston portion 140 connected to lower piston portion 142. Each of upper piston portion 140 and lower piston portion 142 can have circular cross-sections taken orthogonal to axis A-A. At least a part of upper piston portion 140 is cylindrical. At least a part of lower piston portion 142 is cylindrical.

Upper piston portion 140 extends out of mounting frame 48 to connect with drive link 108. Seal nut 134 is disposed at an upper end of mounting frame 48. Seal nut 134 retains upper seal 136 within mounting frame 48. Upper piston portion 140 extends through seal nut 134 and interfaces with upper seal 136. The interface between upper piston portion 140 and upper seal 136 prevents material from leaking out of mounting frame 48 around piston 28.

Piston head 144 is configured to be disposed in receiving slot 110. Neck 146 extends form a lower end of piston head 144 out of receiving slot 110. Neck 146 has a smaller diameter than piston head 144 to facilitate the flange of drive link 108 extending under piston head 144 to retain piston head 144 within receiving slot 110 during reciprocation. Upper body 148 extends from neck 146 such that neck 146 is disposed axially (along pump axis A-A) between upper body 148 and head 144. Connection bore 150 extends into upper piston portion 140. Connection bore 150 extends into upper piston portion 140 from an end of upper piston portion 140 opposite head 144.

Lower piston portion 142 is connected to upper piston portion 140 to reciprocate with upper piston portion 140. In the example shown, lower piston portion 142 is mounted to upper piston portion 140 at connection bore 150. As shown, the diameter of lower piston portion 142 is smaller than the diameter of upper piston portion 140. Upper end 152 of lower piston portion 142 extends into connection bore 150 to connect lower piston portion 142 to upper piston portion 140. For example, upper end 152 and connection bore 150 can include interfaced threading. It is understood, however, that lower piston portion 142 can be connected to upper piston portion 140 in any desired manner. The engagement between upper piston portion 140 and lower piston portion 142 can be altered, to have more or less axial overlap between the two portions, to thereby alter the location of traveling check valve 128 within cylinder 50.

Mounting frame 48 supports other components of fluid module 14. Cylinder 50 is connected to mounting frame 48 and is elongate along axis A-A. Cylinder 50 extends in first axial direction AD1 from mounting frame 48. For example, cylinder 50 can include cylinder plate 164 that mounts to mounting frame 48, such as by fasteners, to secure cylinder 50 to mounting frame 48. In some examples, the cylinder plate 164 is formed separately from cylinder 50 and cylinder 50 is connected to cylinder plate 164, such as by interfaced threading. Cylinder 50 is configured to extend into bucket 36 and be at least partially submerged in the mud.

Pump inlet 130 is formed in an end of cylinder 50 opposite mounting frame 48. Pump inlet 130 provides one or more openings through which the mud can enter fluid module 14. Inlet check valve 126 is disposed proximate pump inlet 130. Traveling check valve 128 is mounted to lower end 154 of lower piston portion 142. Inlet check valve 126 and traveling check valve 128 are one-way valves that allows material to flow in one direction and prevent flow in an opposite direction. Traveling check valve 128 circumferentially seals with the inner surface of cylinder 50. Traveling check valve 128 divides the interior of cylinder 50 into lower chamber 166 and upper chamber 168. Inlet check valve 126 can be of any type suitable for facilitating one way flow into lower chamber 166. For example, inlet check valve 126 can be a flapper valve or ball valve, among other options. Traveling check valve 128 can be of any type suitable for facilitating one way flow from lower chamber 166 to upper chamber 168. For example, traveling check valve 128 can be a flapper valve or ball valve, among other options.

Pump outlet 132 is formed in mounting frame 48. The flowpath of material through fluid module 14 is through pump inlet 130 and inlet check valve 126 into lower chamber 166, through traveling check valve 128 into upper chamber 168, through upper chamber 168 to mounting frame 48, and through mounting frame 48 to pump outlet 132. As such, cylinder 50 and mounting frame 48 each define at least a portion of the flowpath through fluid module 14.

Outlet connector 52 is attached to mounting frame 48 proximate pump outlet 132. Inlet end 158 of outlet connector 52 interfaces with mounting frame 48. The pumped material enters outlet connector 52 through inlet end 158, flows through the flowpath defined by outlet connector 52, and exits outlet connector 52 through outlet end 160. In the example shown, outlet connector 52 is an elbow that defines a bent fluid path. Outlet connector 52 can reroute the material from a substantially horizontal flow at inlet end 158 to a substantially vertical flow at outlet end 160. In some examples, outlet connector 52 can be configured to have a 90-degree bend in the flowpath. The flow exiting outlet connector 52 has a flow axis transverse to a flow axis of the flow entering outlet connector 52. In some examples, the flow axes can be disposed orthogonally.

Spout 38 is mounted to outlet connector 52. Tube 74 extends from outlet connector 52. Nozzle 76 is mounted to an end of tube 74 opposite outlet connector 52. In the example shown, a portion of spout 38 extends into outlet end 160 and a seal is formed between tube 74 and outlet connector 52 within outlet connector 52. For example, an annular seal, such as an elastomeric seal like an O-ring or U-cup, can be disposed within outlet connector 52 between outlet connector 52 and tube 74. A seal groove can be formed on the inner wall of outlet connector 52 to receive the seal. The seal can remain disposed within outlet connector 52 when spout 38 is detached from outlet connector 52.

Tube 74 extends vertically from outlet end 160. Tube 74 includes a bend configured to reroute the fluid flow through tube 74 from substantially vertical flow at the interface between tube 74 and outlet connector 52 to substantially horizontal flow at the interface between tube 74 and nozzle 76. In some examples, the being in tube 74 can be about 90-degrees. The flow exiting spout 38 has a flow axis transverse to a flow axis of the flow entering spout 38. In some examples, the flow axes can be disposed orthogonally.

Spout 38 is configured such that nozzle 76 is disposed vertically above drive module 12. Nozzle 76 is disposed vertically above each axis C-C, D-D, and E-E. Nozzle 76 can be spaced further in axial direction AD2 from mounting frame 48 than any of motor 16, first stage 92, and second stage 98. As such, nozzle 76 is disposed at a convenient, ergonomic position for dispensing the material, such as into a mud dispensing tool.

During operation, drive module 12 provides motive power to fluid module 14 to cause pumping. Motor 16 is powered and generates a rotational output at motor pinion 90. Motor 16 drives gearing 82 that outputs rotational motion to crank 84. Crank 84 converts the rotational motion into linear reciprocating motion of drive link 108. Starting from the dead center bottom position shown in FIGS. 3A and 3B, drive link 108 is pulled upward along pump axis A-A, pulling piston 28 upward through a suction stroke.

As piston 28 moves upward through a suction stroke, traveling check valve 128 is closed and moves upward within cylinder 50 to decrease the volume of upper chamber 168 and increase the volume of lower chamber 166. The increase in volume of lower chamber 166 pulls material through pump inlet 130 and inlet check valve 126 into lower chamber 166. The decrease in volume of upper chamber 168 forces the material in upper chamber 168 upward into mounting frame 48 and out through pump outlet 132. After completing the upstroke, crank 84 changes over and drives piston 28 downward through a pressure stroke. As piston 28 moves downward through the pressure stroke, traveling check valve 128 moves downward within cylinder 50 to increase the volume of upper chamber 168 and decrease the volume of lower chamber 166. The downward movement of traveling check valve 128 increases pressure in lower chamber 166, closing inlet check valve 126. Traveling check valve 128 opens and the material flows to upper chamber 168 from lower chamber 166 through traveling check valve 128. After completing the downstroke, piston 28 has completed a pump cycle, which consists of an upstroke or suction stroke and a downstroke or pressure stroke. Crank 84 again changes over and piston 28 is moved again through the upstroke. Reciprocation of piston 28 pumps the material from pump inlet 130 to pump outlet 132. Pump outlet 132 provides the material to outlet connector 52, which routes the flow of material upwards and to spout 38. The material flows through spout 38 and is output from transfer pump 10 through nozzle 76.

Transfer pump 10 is a double displacement pump, which means that transfer pump 10 outputs material during each of the upstroke and the downstroke of piston 28. In some examples, the operation is balanced such that for each full pump cycle—each pump cycle includes an upstroke and a downstroke—50% of the volume is output on the upstroke and the other 50% is put on the downstroke. Upper seal 136 can be an O-ring, U-cup, or other type of sealing ring that fits between the exterior of the upper piston portion 140 and the interior of mounting frame 48, or other body in which upper piston portion 140 reciprocates. The upper seal 136 prevents material from moving upward past the upper seal 136, thus directing the flow of material out through pump outlet 132. Traveling check valve 128 defines a lower sealing that engages the inside of cylinder 50 to seal and facilitate controlled movement of the material during pumping.

The ratio of the displacement areas (e.g., the cross-sectional area at the sealing interface taken orthogonal to pump axis A-A) of an upper seal interface between upper piston portion 140 and upper seal 136 and a lower seal interface between traveling check valve 128 and cylinder 50 determines the ratio of material output by transfer pump 10 in each of the up-and-down strokes. For example, if the upper sealing interface has half of the displacement area as the lower sealing interface, then transfer pump 10 outputs material at a 1:1 ratio during the upstroke and the downstroke. In some examples, the displacement area at the lower interface is twice that of the displacement area at the upper interface. In some examples, the displacement area at the upper interface is between about 35%-65% of the displacement area at the lower interface. In some examples, the displacement area at the upper interface is between about 45%-50% of the displacement area at the lower interface.

Pump reaction forces are generated by piston 28 during pumping of the material. Piston 28 experiences a downward reaction force when moving through an upstroke and an upward reaction force when moving through the downstroke. The up and down reaction forces generated during pumping transfer through lower piston portion 142 to upper piston portion 140, through upper piston portion 140 to crank 84 at the dynamic interface, and from crank 84 to drive frame 86. From drive frame 86 the reaction forces are transferred through stand 40 and/or bucket 36 (FIGS. 2A-2C) to the ground surface. Bucket 36 can experience and react at least a portion of the pump reaction forces. For example, pump reaction forces can be transmitted to bucket 36 via bracket 66.

Transfer pump 10 provides significant advantages. Drive module 12 is separable from fluid module 14 to allow electronic components of transfer pump 10 to be fully separated and removed from fluid contacting portions of transfer pump 10. Nozzle 76 is disposed vertically above drive module 12 to provide an ergonomic, convenient location for outputting material from transfer pump 10. Motor 16 and gearing 82 are stacked vertically to provide a compact drive module 12 that is easy to transport and store. The compact drive module 12 also facilitates use of transfer pump 10 in tight quarters, such as those prevalent on job sites. The displacement ratio provided by transfer pump 10 provides a relatively smooth flow out of transfer pump 10 that facilitates quick and efficient filling of mud dispensing tools.

Figure 4:
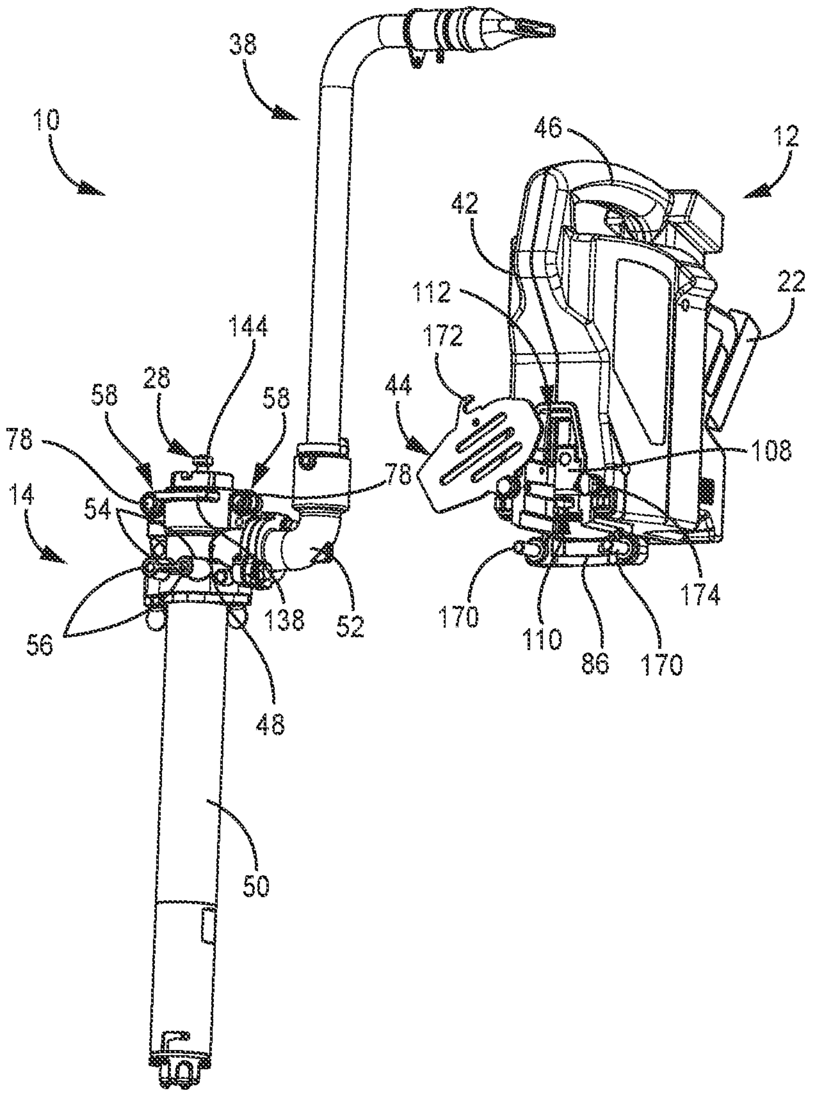
FIG. 4 is an isometric partially exploded view of a transfer pump.

FIG. 4 is an isometric partially exploded view of transfer pump 10 showing drive module 12 separated from fluid module 14. Spout 38 is shown mounted to fluid module 14. Power supply 22, drive housing 42, door 44, handle 46, drive frame 86, drive link 108, and drive cavity 112, of drive module 12 are shown. Drive frame 86 includes mounting posts 170. Door 44 includes latch 172. Drive link 108 includes receiving slot 110. Piston 28, mounting frame 48, cylinder 50, and outlet connector 52 of fluid module 14 are shown. Mounting frame 48 includes stand mount 54, support openings 56, receivers 58, and brace 138. Head 144 of piston 28 is shown.

Drive frame 86 supports other components of drive module 12. Drive housing 42 is mounted to and supported by drive frame 86. Mounting posts 170 project from drive frame 86 and form a portion of the static interface between drive module 12 and fluid module 14. In the example shown, mounting posts 170 form the static component 34*a* of drive frame 86. Mounting posts 170 are configured to extend into receivers 58 through receiving openings 78 on either side of receivers 58. Mounting posts 170 interface with receivers 58 such that drive frame 86 is supported by mounting frame 48. Mounting posts 170 and receivers 58 form the static interface between drive module 12 and fluid module 14. While mounting posts 170 are shown as extending from drive module 12 and receiving openings 78 are shown as formed in fluid module 14, it is understood that mounting posts 170 can extend from fluid module 14, such as from mounting frame 48, and receiving openings 78 can be formed on drive module 12, such as on drive frame 86. As such, the static interface can be formed by a portion of the fluid module 14 being received by a portion of the drive module 12.

Drive cavity 112 is formed at a lower, front end of drive module 12. Drive cavity 112 has an opening through the front side and an opening through the lower side. Drive link 108 is at least partially disposed in drive cavity 112 and is configured to reciprocate within drive cavity 112. Drive link 108 forms the portion of crank 84 (FIGS. 3A and 3B) that reciprocates linearly along pump axis A-A (shown in FIGS. 3A and 3B). Receiving slot 110 is formed at a lower end of drive link 108 and is configured to receive a portion of piston 28. In the example shown, receiving slot 110 is configured to receive head 144 of piston 28. The connection between drive link 108 and piston 28 forms the dynamic interface between drive module 12 and fluid module 14. Drive link 108 drives reciprocation of piston 28 along pump axis A-A.

Door 44 is configured to cover the front opening of drive cavity 112. Door 44 is configured to pivot between an open state and a closed state. Latch 172 is disposed on a lateral side of door 44 and is configured to engage fastener 174 extending from drive housing 42. Latch 172 can be integrally formed with door 44. Fastener 174 can be rotated to lock door 44 in the closed state with latch 172 disposed over fastener 174. Fastener 174 can be rotated in an opposite direction to unlock door and allow for door 44 to be pivoted to the open state. Brace 138 extends from mounting frame 48 and is disposed between receiving openings 78. Mounting frame 48 can include braces 138 on each side of mounting frame 48 between each set of receiving openings 78. Door 44 can interface with brace 138 with door 44 in the closed state to prevent radial movement (relative to axis A-A) of fluid module 14 relative to drive module 12. Door 44 can thereby secure the static connection and lock drive module 12 and fluid module 14 together. Fastener 174 can be tightened and loosed by hand, without the use of tools. As such, drive module 12 can be mounted to fluid module 14 and removed from fluid module 14 by hand and without the use of tools.

Drive module 12 is removable from fluid module 14 and can be mounted in different positions on fluid module 14. As such, drive housing 42 can extend in different orientations relative to axis A-A. The static connection and the dynamic connection can be simultaneously formed when mounting drive module 12 to fluid module 14. Drive module 12 is shifted radially towards fluid module 14 (relative to axis A-A) to insert mounting posts 170 into receivers 58 to form the static connection, and to insert head 144 into receiving slot 110 to form the dynamic connection. Door 44 can be pivoted to the closed state to secure drive module 12 and fluid module 14 together once the static connection and dynamic connection are formed.

During removal, door 44 is rotated to the open state to expose drive cavity 112. Drive module 12 is shifted radially away from fluid module 14 to remove head 144 from receiving slot 110 and withdraw mounting posts 170 from receiving openings 78. The static connection and the dynamic connection can thereby be broken by a single motion. The single motion is done by shifting the drive module 12 radially away from fluid module 14 relative to the pump axis A-A. The static connection and the dynamic connection can be simultaneously formed and simultaneously broken by single motions.

FIG. 5A is an isometric view of transfer pump 10 mounted to bucket 36. FIG. 5B is a top plan view of transfer pump 10 mounted to bucket 36. FIGS. 5A and 5B will be discussed together. In FIGS. 5A and 5B, transfer pump 10 is shown in a compact state with drive module 12 mounted to fluid module 14 and disposed over bucket 36. In the compact state, drive module 12 is mounted to an opposite side of mounting frame 48 than stand 40. Stand 40 is disposed outside of bucket 36 and drive module 12 is positioned over bucket 36.

In the compact state, most or all of drive module 12 is disposed over the opening of bucket 36, reducing the footprint of transfer pump 10. Drive module 12 is mounted to an opposite side of mounting frame 48 from the position shown in FIGS. 2A-2C. Spout 38 can be rotated such that nozzle 76 is not disposed over drive module 12, preventing the material from dripping from nozzle 76 onto drive module 12 or otherwise contacting drive module 12. The compact state frees valuable space on a job site.

Figure 6A:
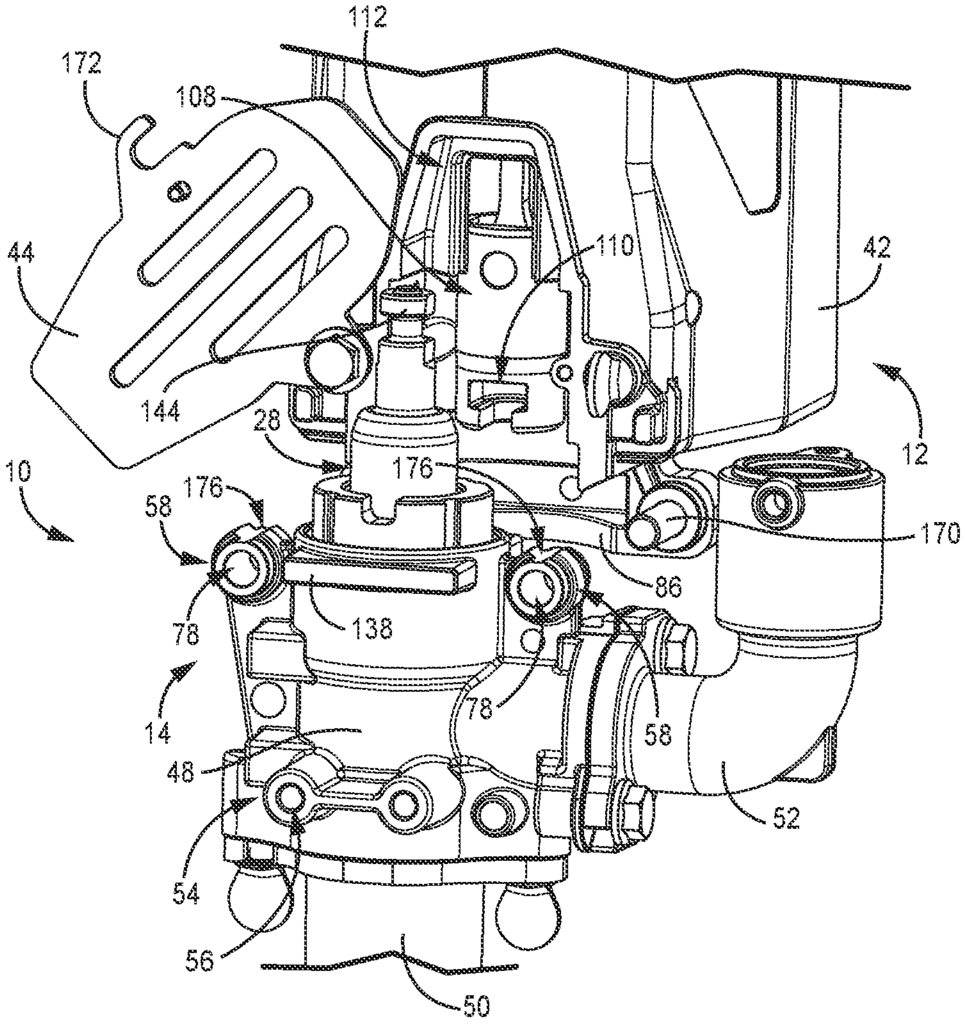
FIG. 6A is an enlarged isometric and exploded view of a transfer pump showing a drive module and fluid module in a misaligned state.
Figure 6B:
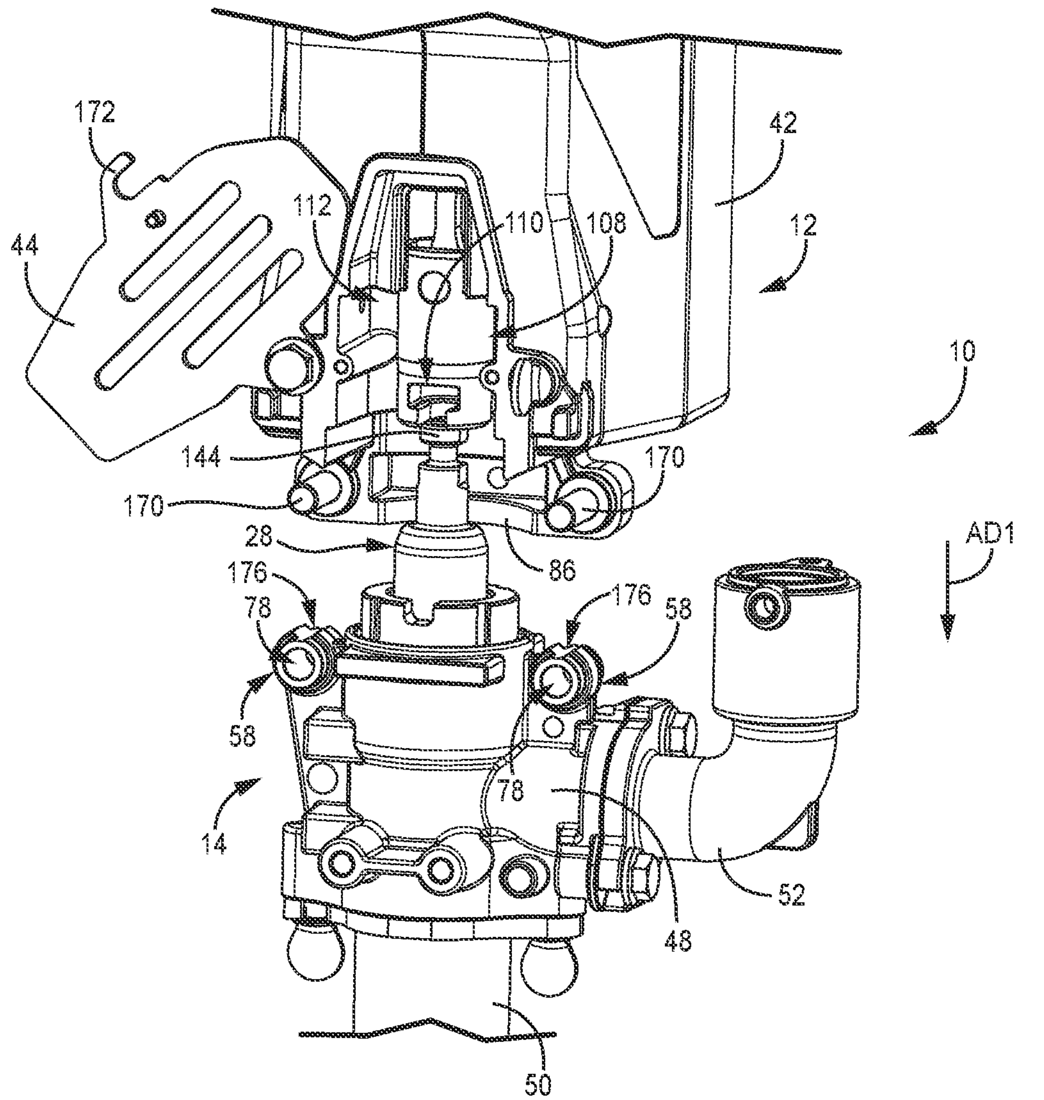
FIG. 6B is an enlarged isometric view showing the drive module and fluid module of the transfer pump in a first alignment state.
Figure 6C:
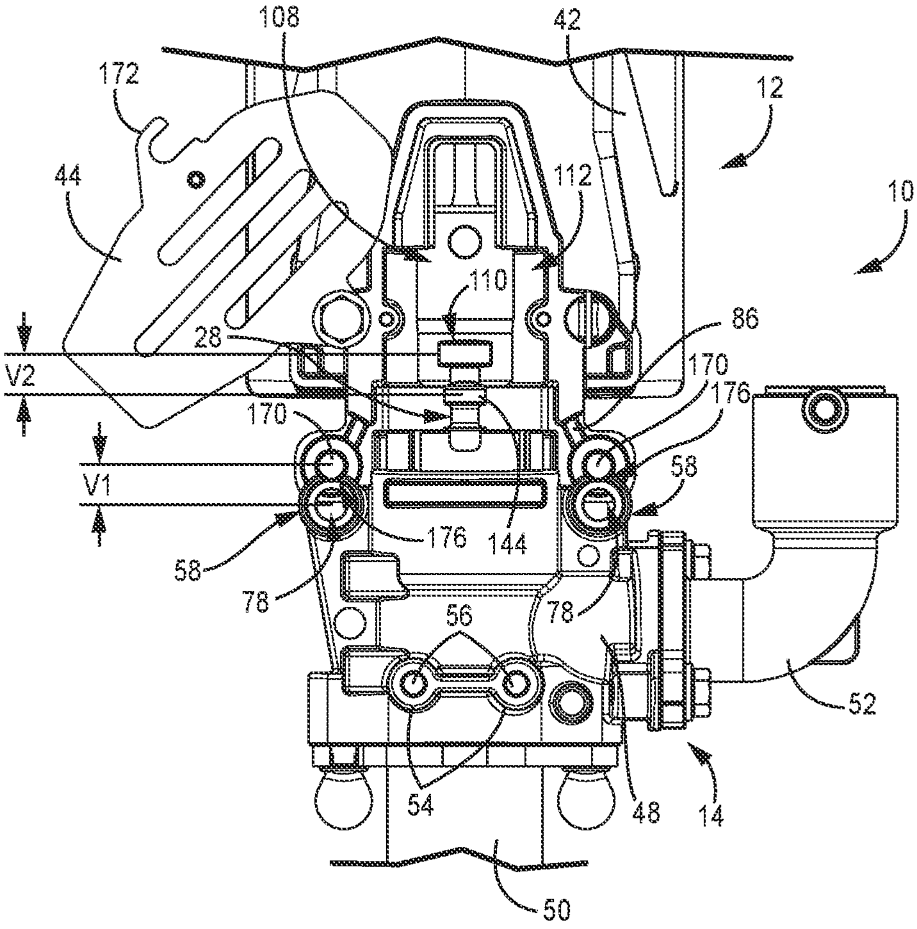
FIG. 6C is an enlarged front elevation view showing the drive module and the fluid module of the transfer pump in a second alignment state.
Figure 6D:
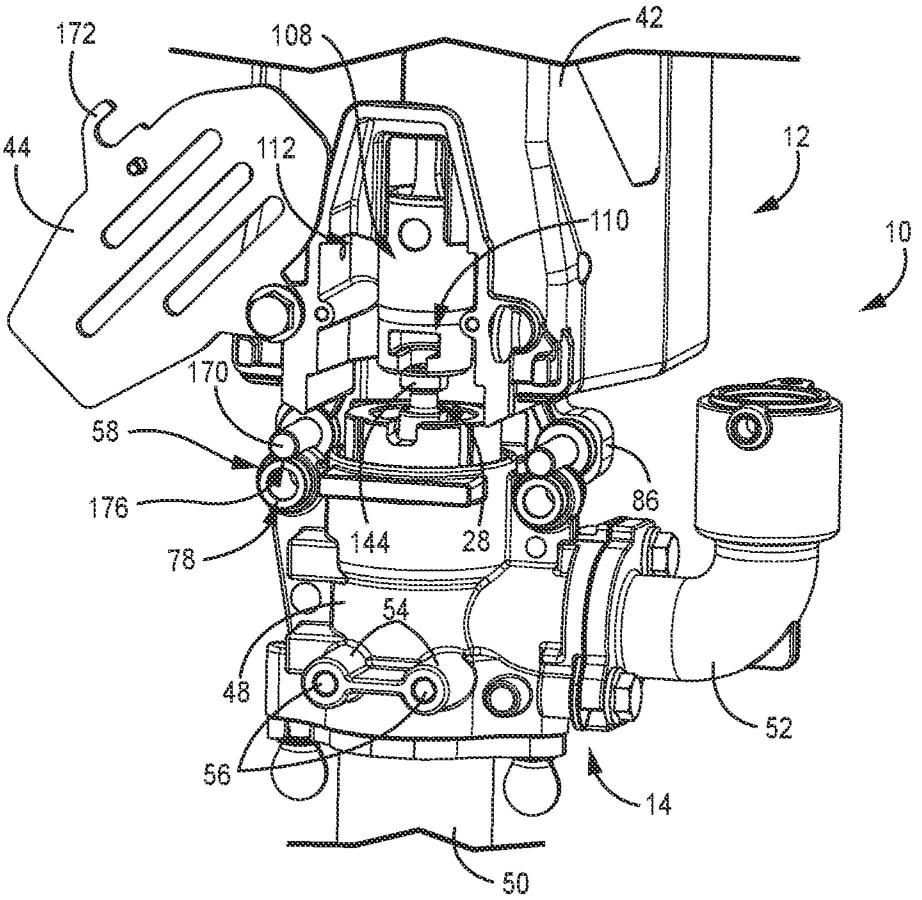
FIG. 6D is an enlarged isometric view showing the drive module and fluid module in the second alignment state.
Figure 6E:
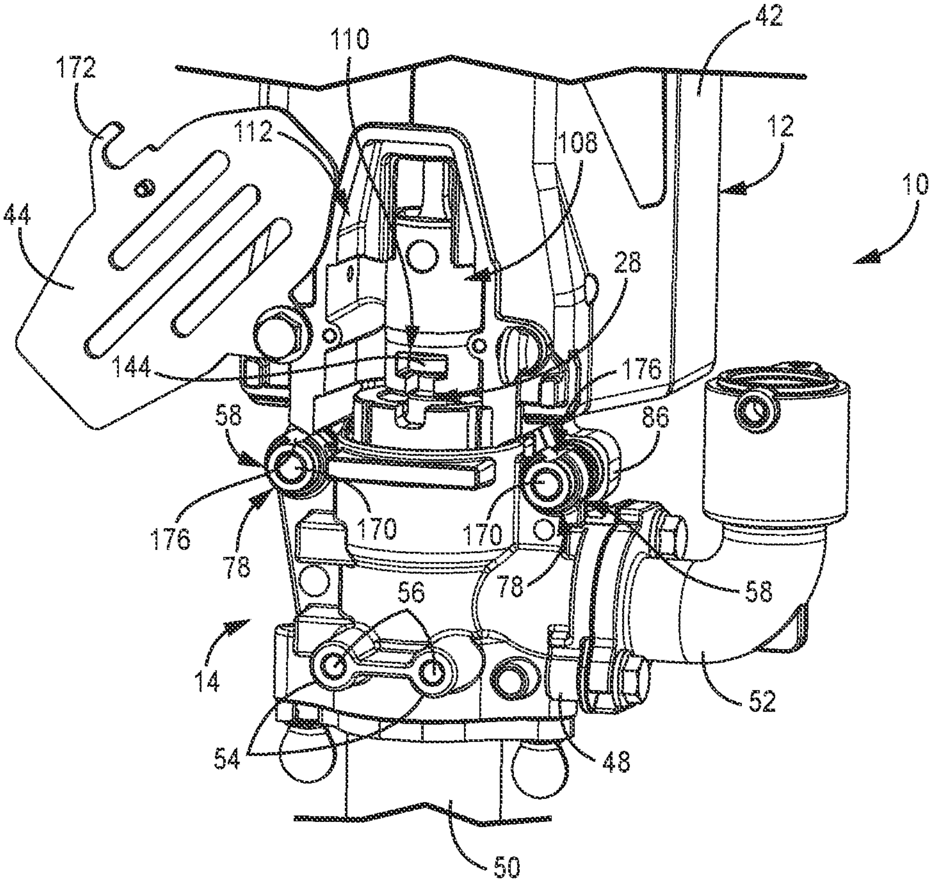
FIG. 6E is an enlarged isometric view showing the drive module mounted to the fluid module.

FIG. 6A is an enlarged isometric and exploded view of a portion of transfer pump 10 showing the interface between drive module 12 and fluid module 14 in a misaligned state. FIG. 6B is an enlarged isometric view showing drive module 12 and fluid module 14 in a first alignment state. FIG. 6C is an enlarged elevation view showing drive module 12 and fluid module 14 in a second alignment state. FIG. 6D is an enlarged isometric view showing drive module 12 and fluid module 14 in the second alignment state. FIG. 6E is an enlarged isometric view showing drive module 12 mounted to fluid module 14. FIGS. 6A-6E will be discussed together. Drive housing 42, door 44, drive frame 86, drive link 108, and drive cavity 112 and of drive module 12 are shown. Drive frame 86 includes mounting posts 170. Door 44 includes latch 172. Drive link 108 includes receiving slot 110. Piston 28, mounting frame 48, cylinder 50, and outlet connector 52 of fluid module 14 are shown. Stand mount 54, support openings 56, receivers 58, receiving openings 78, brace 138, and grooves 176 of mounting frame 48 are shown. Head 144 of piston 28 is shown.

As discussed above, drive module 12 is separable from fluid module 14 and can be mounted to different ones of fluid modules 14 and in different orientations relative to fluid module 14. Drive module 12 is mounted to fluid module 14 by shifting drive module 12 radially towards fluid module 14 (relative to pump axis A-A (FIGS. 3A and 3B)) to form both the dynamic connection and the static connection. Piston 28 is connected to drive link 108 to form the dynamic connection. Each of piston 28 and drive link 108 reciprocate along pump axis A-A during operation. Mounting posts 170 extend into receivers 58 to form the static connection by which fluid module 14 structurally supports drive module 12. Grooves 176 are formed on the upper surfaces of each receiver 58.

As shown in FIG. 6A, piston 28 and drive link 108 may be misaligned when mounting posts 170 and receiving openings 78 are aligned, which prevents mounting of drive module 12 to fluid module 14. Drive module 12 can be utilized to reposition piston 28 to the location where head 144 is aligned with receiving slot 110 when mounting posts 170 are aligned with receiving opening. In FIG. 6A, piston 28 is shown at the position associated with the end of an upstroke and drive link 108 is shown at the position associated with the end of a downstroke.

As shown in FIG. 6B, drive module 12 is initially positioned over fluid module 14 such that the top of head 144 contacts the bottom of drive link 108. Drive link 108 and piston 28 are thereby aligned on pump axis A-A but in a disconnected state. Drive module 12 is shifted downward in axial direction AD1 along pump axis A-A towards fluid module 14. Drive link 108 pushes piston 28 downward in direction AD1 along pump axis A-A. Drive module 12 is shifted until mounting posts 170 are disposed in grooves 176 on receivers 58, as shown in FIGS. 6C and 6D. With mounting posts 170 disposed in grooves 176, the vertical distance V1 between receiver opening 78 and mounting post 170 is the same as the vertical distance V2 between head 144 and receiving slot 110. As such, the components of transfer pump 10 forming the dynamic connection and the static connection are properly aligned when mounting posts 170 are disposed in grooves 176 to contact receivers 58 and head 144 contacts the bottom surface of drive link 108.

With mounting posts 170 disposed in grooves 176, drive module 12 is removed from over fluid module 14 mounting posts 170 are aligned with receiving openings 78 and head 144 aligned with receiving slot 110. Drive module 12 is shifted radially relative to pump axis A-A and towards fluid module 14 to mount drive module to fluid module 14, as shown in FIG. 6E. Mounting posts 170 are received within receivers 58 and head 144 is received within receiving slot 110.

Piston 28 can be moved to the position shown in FIG. 6A prior to beginning the alignment process. For example, the user can grasp piston 28 and pull piston 28 to the position associated with the end of the upstroke prior to performing the alignment. Positioning piston 28 at the position associated with the end of the upstroke facilitates alignment regardless of the initial position of drive link 108. In the example shown, piston 28 is pushed from the fully up position to the fully down position during the mounting and alignment process, due to drive link 108 being in the position associated with the end of a downstroke. However, drive link 108 can be at any position between those associated with the ends of the upstroke and downstroke prior to mounting. Placing piston 28 in the position associated with the end of the upstroke prior to performing the alignment process allows piston 28 to be repositioned to align with drive link 108 regardless of the initial position of drive link 108.

The process of aligning and mounting drive module 12 on fluid module 14 provides significant advantages. Seating mounting posts 170 in grooves 176 aligns head 144 with receiving slot 110 regardless of the vertical position of drive link 108 (e.g., at any position between and including the positions associated with the top of the upstroke and bottom of the downstroke). As such, the user is not required to use a trial and error process to align drive module 12 and fluid module 14. The aligning and mounting process facilitates quick, efficient connection between drive module 12 and fluid module 14. The process further facilitates quick, efficient swapping of a single drive module 12 between multiple fluid modules 14.

Figure 7A:
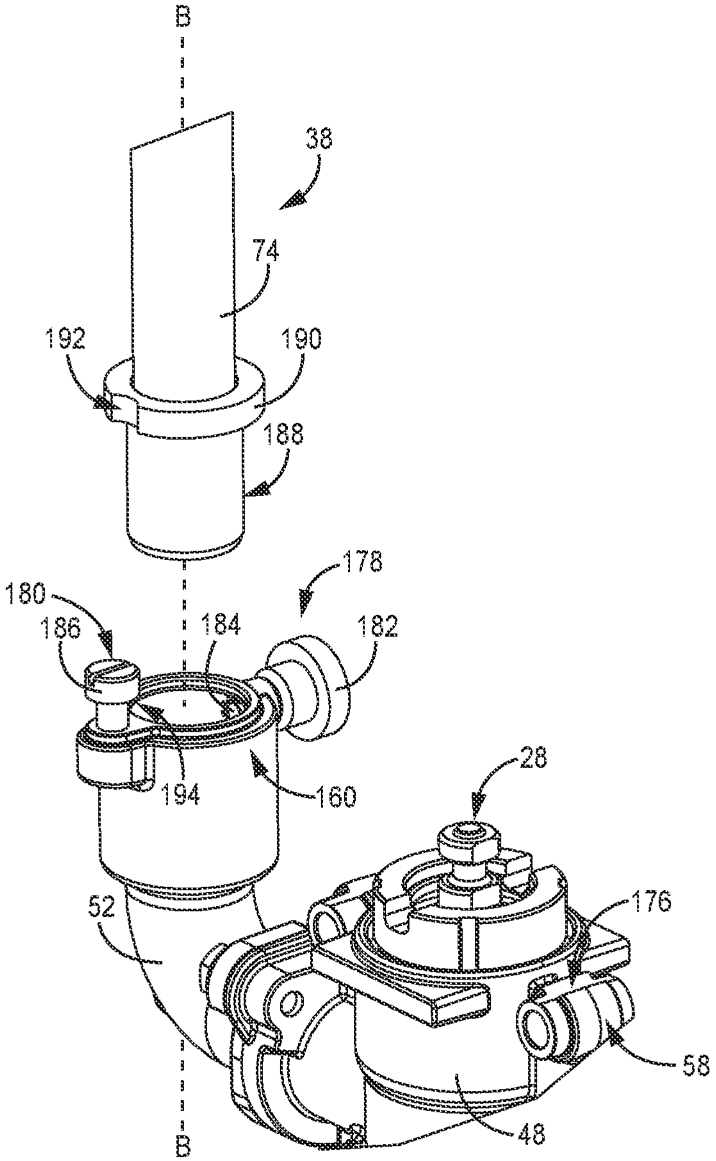
FIG. 7A is an enlarged isometric and exploded view showing an interface between a spout and a fluid module.
Figure 7B:
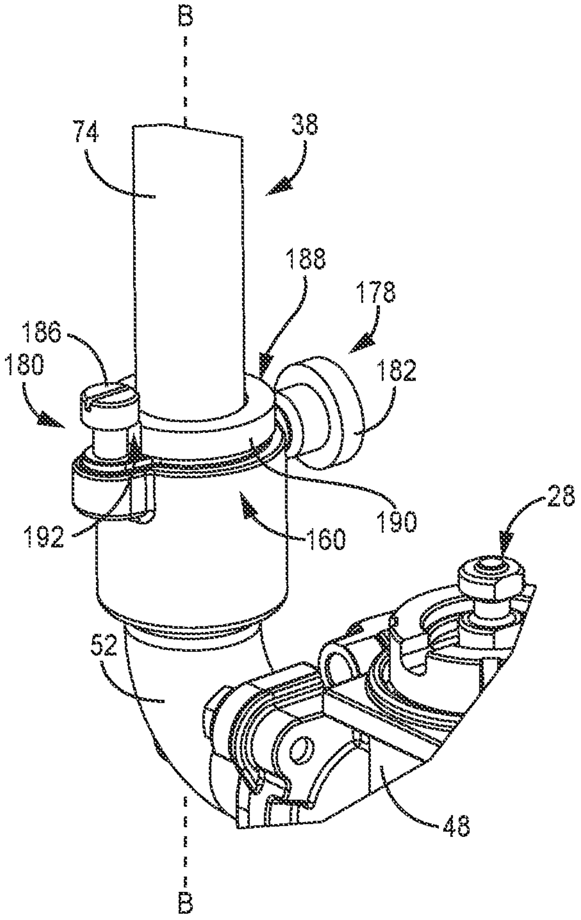
FIG. 7B is an enlarged isometric view showing the spout mounted to the fluid module.

FIG. 7A is an enlarged isometric and exploded view of the interface between spout 38 and fluid module 14. FIG. 7B is an enlarged isometric view showing spout 38 mounted to fluid module 14. FIGS. 7A and 7B will be discussed together. Piston 28, mounting frame 48, and outlet connector 52 of fluid module 14 are shown. Outlet end 160, spout lock 178, and pin 180 of outlet connector 52 are shown. Spout lock 178 includes lock knob 182 and shaft 184. Pin 180 includes pin head 186. Inlet adaptor 188 and tube 74 of spout 38 are shown. Inlet adaptor 188 includes flange 190. Flange 190 includes notch 192.

Outlet connector 52 is attached to mounting frame 48. Spout 38 mounts to outlet end 160 of outlet connector 52. More specifically, inlet adaptor 188 is configured to extend into the opening at outlet end 160 of outlet connector 52.

Pin 180 is disposed adjacent the edge of the opening at the outlet end 160 of outlet connector 52. Pin head 186 is spaced from outlet connector 52 such that a gap is formed between the bottom side of pin head 186 and the top side of the outlet end 160 of outlet connector 52. Spout lock 178 is connected to outlet connector 52 and, in the example shown, at least partially extends through the side wall of outlet connector 52. Spout lock 178 interfaces with and is supported by outlet connector 52. Lock knob 182 of spout lock 178 is disposed outside of outlet connector 52 and lock shaft 184 extends through the wall of outlet connector 52. In some examples, lock shaft 184 is connected to outlet connector 52 by a threaded interface. Spout lock 178 is movable between a locked state, in which spout lock 178 secures spout 38 to outlet connector 52 such that an orientation of nozzle 78 (best seen in FIGS. 8A-8C) relative to axis B-B is fixed, and an unlocked state, in which spout 38 can be rotated about axis B-B and relative to outlet connector 58. For example, lock knob 182 can be grasped and rotated to cause lock shaft 184 to extend further into outlet connector 52 and engage inlet adaptor 188, thereby fixing the orientation of spout 38 relative to outlet connector 52. Lock knob 182 can be rotated in an opposite direction to disengage lock shaft 184 from inlet adaptor 188.

Tube 74 is connected to and extends from inlet adaptor 188. In some examples, tube 74 and inlet adaptor 188 can be permanently attached to form a single unit. For example, tube 74 and inlet adaptor 188 can be integrally formed. In some examples, tube 74 is removable from inlet adaptor 188, such as in examples with tube 74 threadedly connected to inlet adaptor 188. Flange 190 extends radially from inlet adaptor 188 relative to axis B-B. Notch 192 is formed on a radially outer edge of flange 190. In the example shown, notch 192 is formed as a scallop on the radially outer edge of flange 190, though it is understood that other configurations are possible. The body of inlet adaptor 188 extends axially from a bottom side of flange 190.

During mounting, spout 38 is positioned relative to outlet connector 52 such that pin head 186 is aligned with notch 192. Spout 38 is lowered from the position shown in FIG. 7A to the position shown FIG. 7B. Notch 192 is sized to allow pin head 186 to pass by flange 190 through notch 192 when tube 74 is mounted to outlet connector 52. Flange 190 is sized to fit within the gap 194 between pin head 186 and outlet connector 52. The height of flange 190 is less than the height of gap 194. Spout 38 can be repositioned relative to outlet connector 52 so that nozzle 76 can be pointed in different directions relative to axis B-B. In the example shown, spout 38 is rotatable on axis B-B. While spout 38 is configured to rotate on axis B-B, outlet connector 52 does not rotate with spout 38. Spout lock 178 can be placed in the locked state to fix nozzle 76 in a desired orientation.

Flange 190 and pin 180 provide a keyed connection such that aligning notch 192 with pin 180 allows for installation and removal of spout 38 from outlet connector 52, but misalignment between notch 192 and pin 180 prevents spout 38 from lifting off of or away from outlet connector 52. As such, the keyed interface allows for spout 38 to rotate about axis B-B but prevents, when misaligned, spout 38 from moving axially away from outlet connector 52 along axis B-B. The keyed interface prevents spout 38 from popping off of outlet connector 52 when pumping under pressure. The keyed interface between spout 38 and outlet connector 52 facilitates toolless installation of spout 38 on outlet connector 52 and toolless removal of spout 38 from outlet connector 52.

Figure 8A:
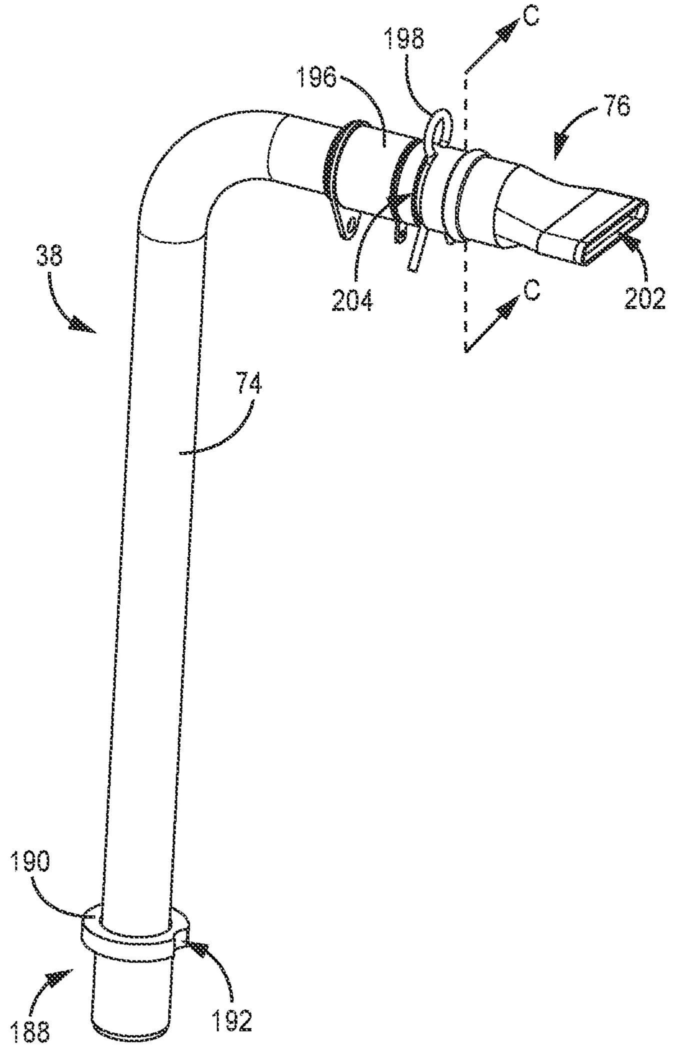
FIG. 8A is an isometric view of a spout.
Figure 8B:
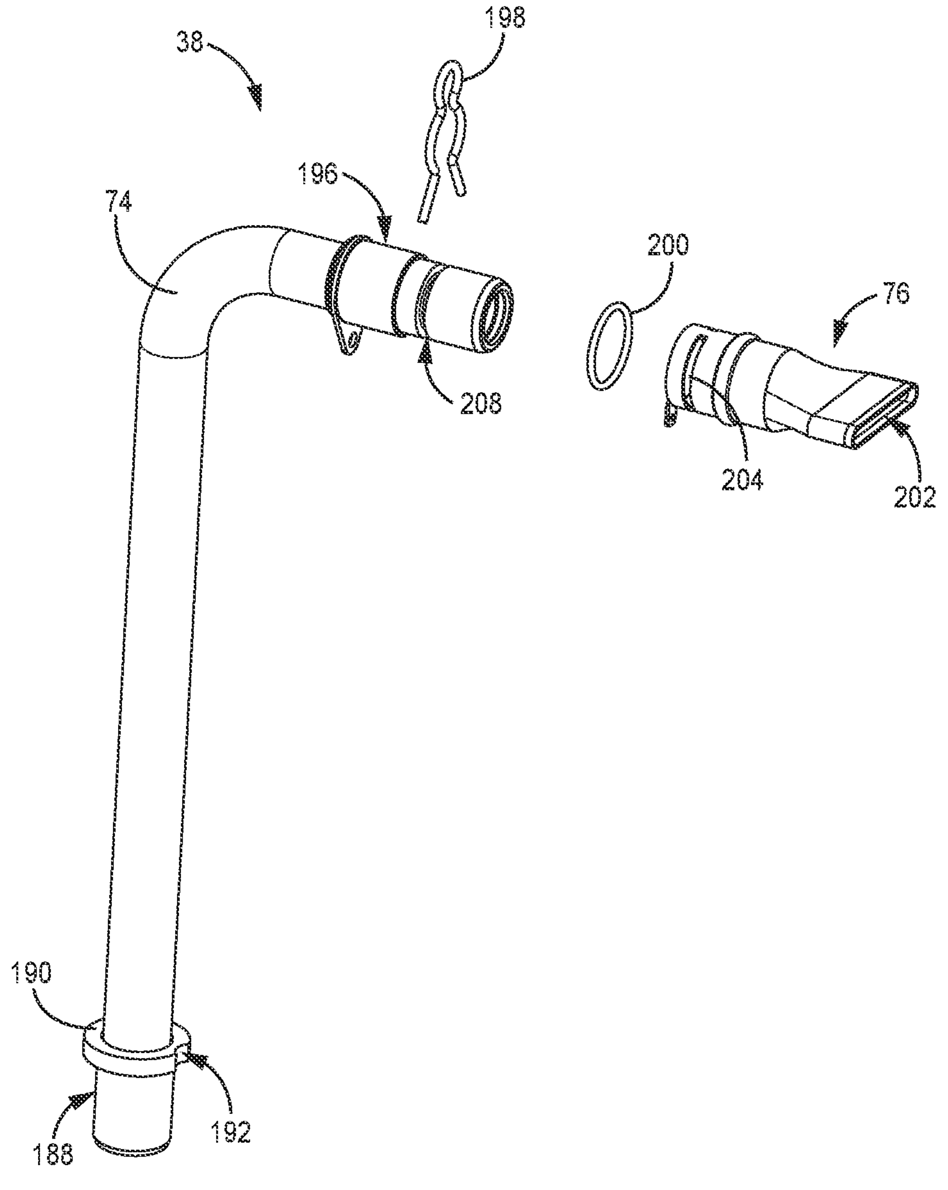
FIG. 8B is an exploded view of the spout.
Figure 8C:
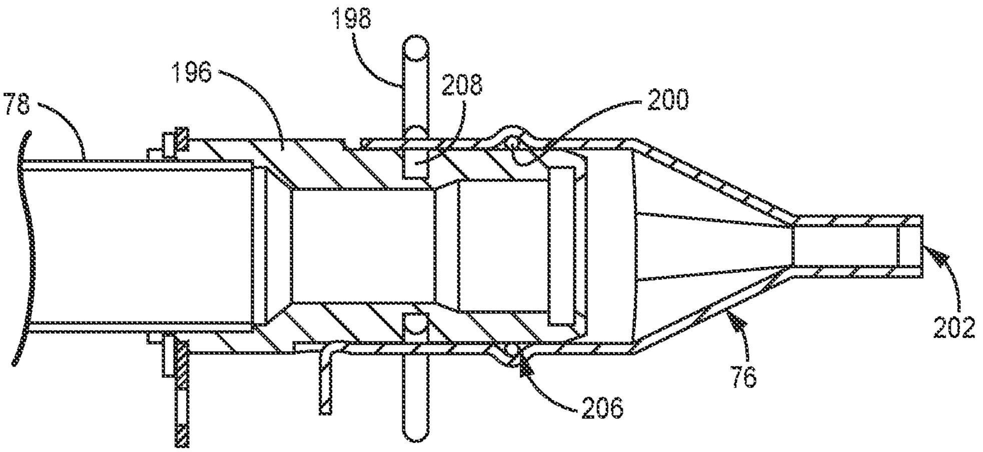
FIG. 8C is an enlarged cross-sectional view taken along line C-C in FIG. 8A.

FIG. 8A is an isometric view of spout 38. FIG. 8B is a partially exploded view of spout 38. FIG. 8C is an enlarged cross-sectional view taken along line C-C in FIG. 8A. FIGS. 8A-8C will be discussed together. Tube 74, nozzle 76, inlet adaptor 188, outlet adaptor 196, clip 198, and nozzle seal 200 of spout 38 are shown. Nozzle 76 includes outlet orifice 202, nozzle slots 204, and seal groove 206. Inlet adaptor 188 includes flange 190 having notch 192. Outlet adaptor 196 includes annular groove 208.

Tube 74 is connected to each of inlet adaptor 188 and outlet adaptor 196. Inlet adaptor 188 is disposed at an inlet end of tube 74 and outlet adaptor 196 is disposed at an outlet end of tube 74. Tube 74 includes a bend between inlet adaptor 188 and outlet adaptor 196 to reorient the flow through tube 74. For example, the bend can be about a 90-degree bend to reorient the flow from substantially vertical at inlet adaptor 188 to substantially horizontal at outlet adaptor 196. Nozzle 76 is configured to emit material through outlet orifice 202, which is shown as an elongate orifice. In the example shown, nozzle 76 is of a duckbill configuration.

Nozzle 76 is removably mounted to outlet adaptor 196. Nozzle slots 204 extend through nozzle 76 proximate an inlet end of nozzle 76. Nozzle slots 204 are configured to align with annular groove 208 on outlet adaptor 196. Clip 198 secures nozzle 76 to tube 74. Clip 198 extends through nozzle slots 204 and into annular groove 208 to secure nozzle 76 to tube 74. Nozzle 76 can be rotated relative to tube 74 to change the orientation of outlet orifice 202. Annular groove 208 facilitates rotating nozzle 76 to the desired orientation while nozzle 76 is secured to outlet adaptor 196.

Nozzle 76 includes an annular projection that defines seal groove 206. Nozzle seal 200 is disposed in seal groove 206 and engages with the outer surface of outlet adaptor 196. Nozzle seal 200 can be an elastomeric seal. Nozzle seal 200 can be an O-ring or U-cup, among other types of sealing rings. Nozzle seal 200 is disposed in seal groove 206 such that nozzle seal 200 can be installed with nozzle 76 and removed with nozzle 76. Nozzle seal 200 is between the exterior of outlet adaptor 196 and the interior of nozzle 76. Nozzle seal 200 is disposed at a location outside of the flowpath through outlet adaptor 196 and nozzle 76 to protect nozzle seal 200 and prevent caking of material on nozzle seal 200.

Figure 9:
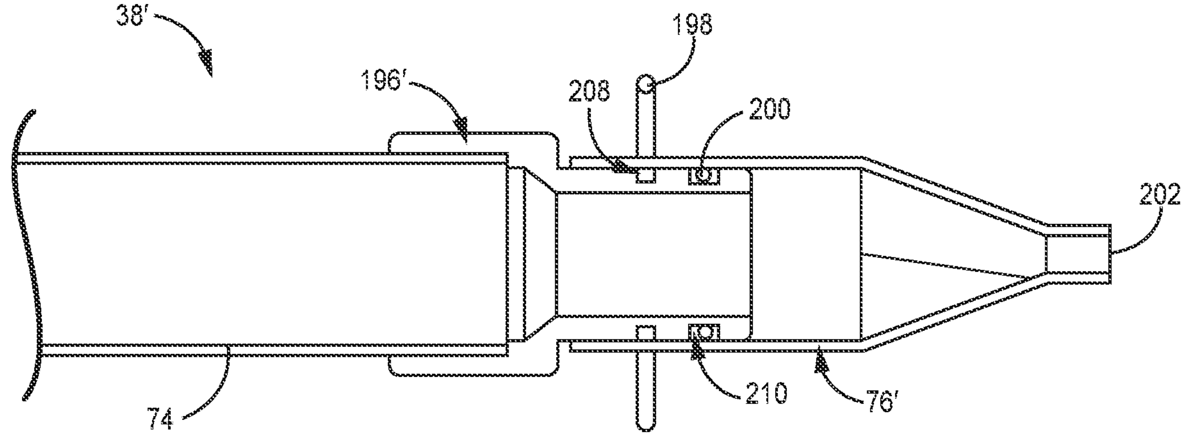
FIG. 9 is an enlarged cross-sectional view showing a nozzle connected to an outlet adaptor of a spout.

FIG. 9 is an enlarged cross-sectional view showing nozzle 74' connected to outlet adaptor 196'. Spout 38' is substantially similar to spout 38, except outlet adaptor 196' includes an annular seal groove 210 within which nozzle seal 200 is disposed. Seal groove 210 is disposed between the outlet end of outlet adaptor 196 and annular groove 208. Annular nozzle seal 200 can remain on outlet adaptor 196 during installation and removal of nozzle 76'.

Figure 10:
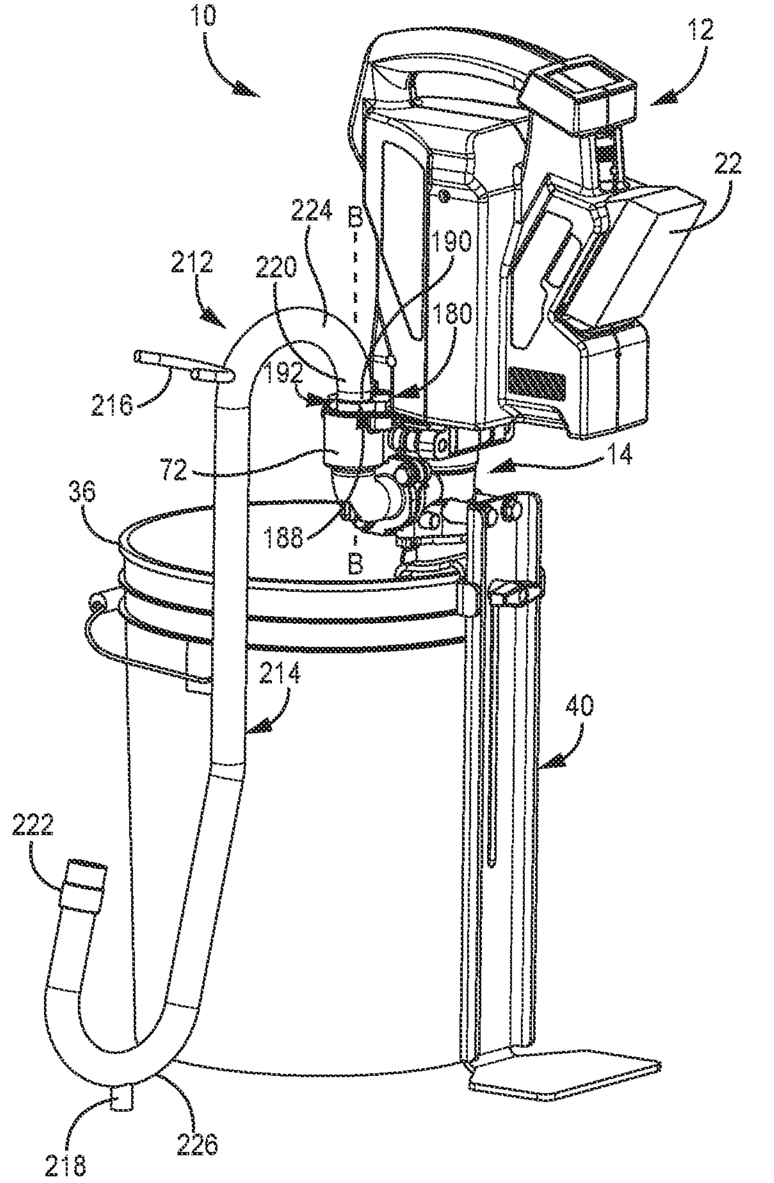
FIG. 10 is an isometric view of a transfer pump mounted to a bucket and including a gooseneck spout.

FIG. 10 is an isometric view of transfer pump 10 having gooseneck spout 212. Gooseneck spout 212 includes inlet adaptor 188, gooseneck tube 214, bracket 216, and support 218. Gooseneck spout 212 extends between inlet end 220 and outlet end 222. Gooseneck tube 214 includes first bend 224 and second bend 226.

Gooseneck spout 212 mounts to outlet connector 52 to receive pumped material through outlet connector 52. Gooseneck spout 212 receives material from outlet connector 52 at inlet end 220. First bend 224 redirects the material flow from substantially vertically upward at inlet adaptor 188 to substantially vertically downward. Second bend 226 redirects the flow from substantially downward to substantially upward to outlet end 222. First bend 224 can be about a 180-degree bend. Second bend 226 can be about a 180-degree bend. Bracket 216 is connected to gooseneck tube 214. Gooseneck tube 214 is configured such that a mud dispensing tool can be connected to outlet end 222 and supported by bracket 216 during filling of the mud dispensing tool. Support 218 extends from second bend 226 and is configured to support gooseneck spout 212 on a ground surface.

A portion of gooseneck spout 212 can be disposed over bucket 36 such that a portion of gooseneck spout 212 is within the footprint of bucket 36 while another portion of gooseneck spout 212 is disposed outside of the footprint of bucket 36. Outlet end 222 of gooseneck spout 212 is disposed vertically below the annular lip defining the opening of bucket 36. Outlet end 222 is disposed vertically below drive module 12. Outlet end 222 is disposed vertically below mounting frame 48. Outlet end 222 is disposed vertically below inlet end 220.

Gooseneck spout 212 is repositionable relative to outlet connector 52 while mounted to outlet connector 52. In the example shown, gooseneck spout 212 is rotatable about axis B-B while mounted to outlet connector 52. Flange 190 and pin 180 provide a keyed connection such that aligning notch 192 with pin 180 allows for installation and removal of gooseneck spout 212 from outlet connector 52, but misalignment between notch 192 and pin 180 prevents gooseneck spout 212 from lifting off of or away from outlet connector 52. As such, the keyed interface allows for gooseneck spout 212 to rotate about axis B-B but prevents, when misaligned, gooseneck spout 212 from moving axially away from outlet connector 52 along axis B-B. The keyed interface prevents gooseneck spout 212 from popping off of outlet connector 52 when pumping under pressure. The keyed interface between gooseneck spout 212 and outlet connector 52 facilitates toolless installation of gooseneck spout 212 on outlet connector 52 and toolless removal of gooseneck spout 212 from outlet connector 52.

Figure 11:
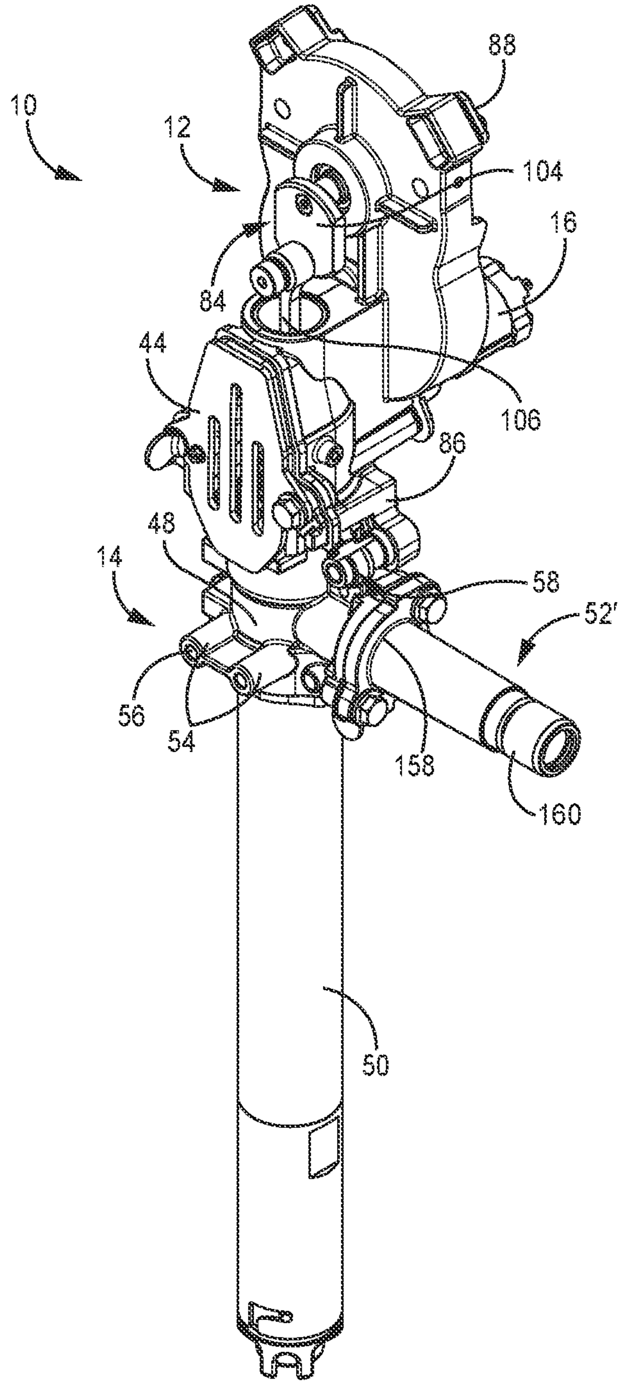
FIG. 11 is an isometric view of a transfer pump with a drive housing removed and including another embodiment of an outlet connector.

FIG. 11 is an isometric view of transfer pump 10 with drive housing 42 removed and including outlet connector 52'. Outlet connector 52' includes inlet end 158 and outlet end 160. Outlet connector 52' is substantially similar to outlet connector 52 (best seen in FIGS. 2A, 2B, and 3A), except outlet connector 52' routes the material along a flow axis that extends between the inlet end 158 and the outlet end 160 of outlet connector 52'. As such, the flow remains substantially horizontal through outlet connector 52'. In some examples, outlet connector 52' can include a pin, similar to pin 180 (best seen in FIGS. 7A and 7B) to facilitate mounting and dismounting of a spout, such as spout 38 (best seen in FIGS. 8A-8C), to outlet end 160 of outlet connector 52'. Spout 38 can be mounted to outlet connector 52' and rotated about the flow axis to orient nozzle 76 in different directions relative to the flow axis. A mud dispensing tool can be connected directly to the outlet end 160 of outlet connector 52' to fill the mud dispensing tool.

Figure 12A:
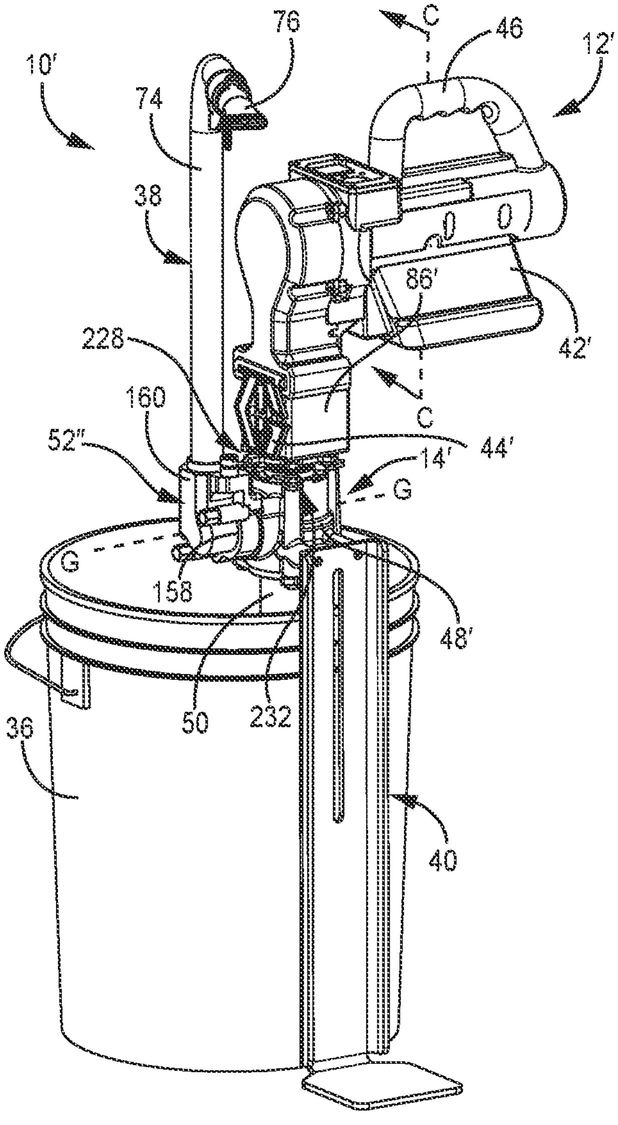
FIG. 12A is an isometric view of a transfer pump.
Figure 12B:
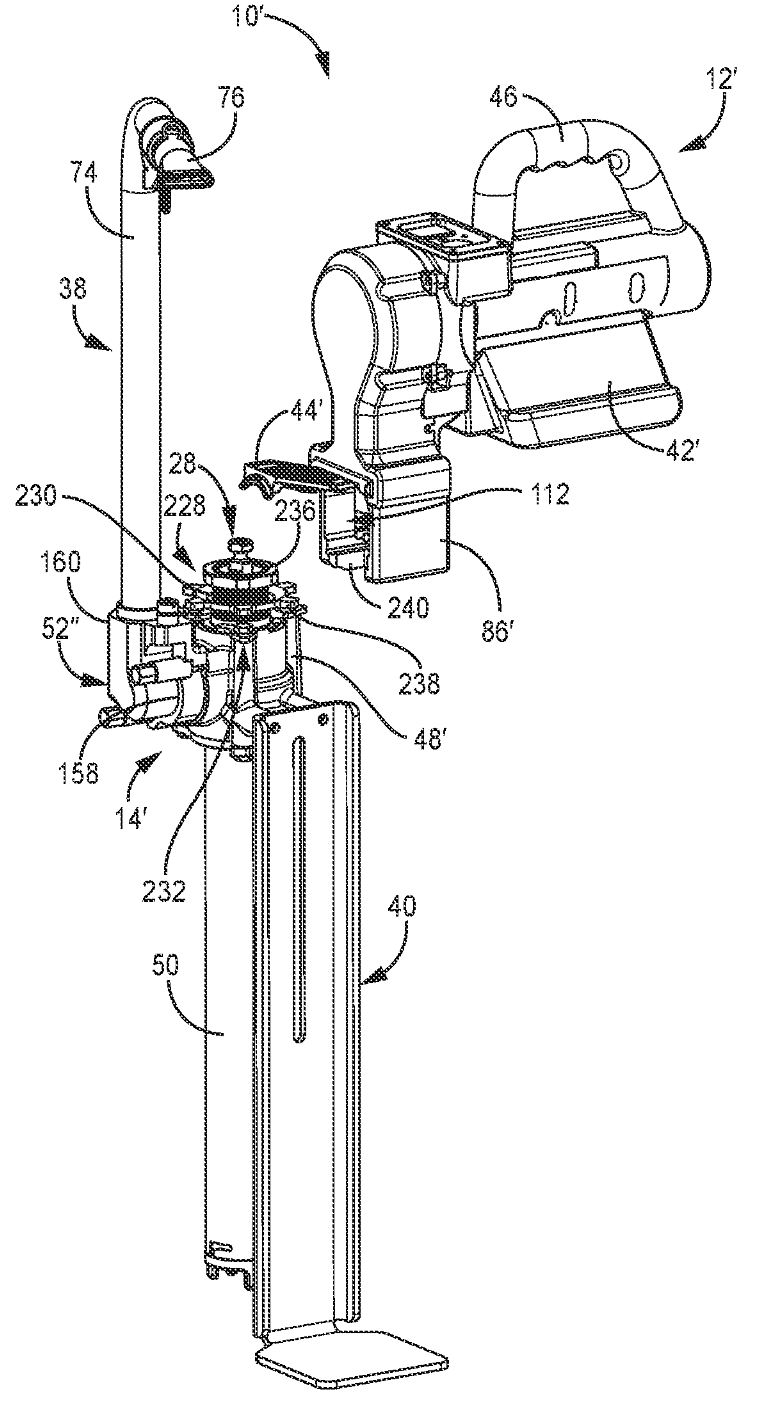
FIG. 12B is a partially exploded view of the transfer pump shown in FIG. 12A.
Figure 12C:
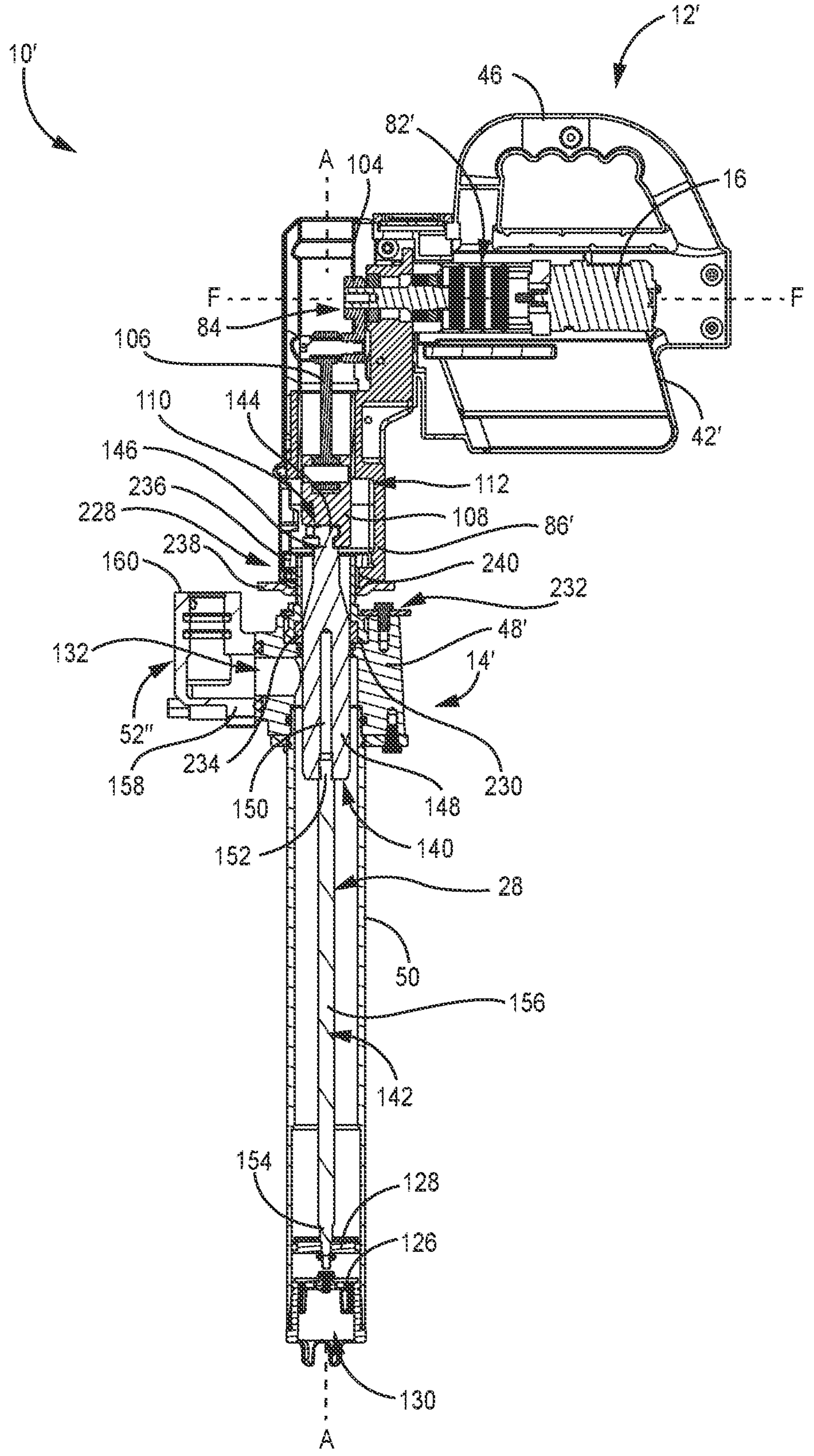
FIG. 12C is a cross-sectional view of the transfer pump shown in FIG. 12A taken along line C-C in FIG. 12A.

FIG. 12A is an isometric view of transfer pump 10'. FIG. 12B is a partially exploded view of transfer pump 10'. FIG. 12C is a cross-sectional view of transfer pump 10' taken along line C-C in FIG. 12A. FIGS. 12A-12C will be discussed together. Transfer pump 10' is substantially similar to transfer pump 10 (best seen in FIGS. 2A-3B). Drive module 12', fluid module 14', spout 38, and stand 40 of transfer pump 10' are shown.

Motor 16, drive housing 42', door 44', handle 46, gearing 82', crank 84, and drive frame 86' of drive module 12' are shown. Crank 84 includes eccentric 104, arm 106, and drive link 108. Drive link 108 includes receiving slot 110. Drive cavity 112 of drive frame 86' is shown.

Piston 28, mounting frame 48', cylinder 50, outlet connector 52", inlet check valve 126, traveling check valve 128, pump inlet 130, pump outlet 132, clamp 228, adaptor 230, adaptor lock 232, and guide bushing 234 of fluid module 14' are shown. Piston 28 includes upper piston portion 140 and lower piston portion 142. Upper piston portion 140 includes head 144, neck 146, upper body 148, and connection bore 150. Lower piston portion 142 includes upper end 152, lower end 154, and lower body 156. Clamp 228 includes support ring 236 and securing ring 238. Inlet end 158 and outlet end 160 of outlet connector 52" are shown. Tube 74 and nozzle 76 of spout 38 are shown.

Drive module 12' is removably mounted to fluid module 14'. Drive module 12' includes the electronic components of transfer pump 10' and is configured to not contact the pumped material during operation. Fluid module 14' extends into bucket 36 and is configured to contact and pump the material during operation.

Motor 16 is disposed in drive housing 42. Gearing 82' is disposed between motor 16 and crank 84. Motor 16 outputs rotational motion to gearing 82' and gearing 82' outputs rotational motion to crank 84. Gearing 82' can include planetary gears, among other options. In the example shown, motor 16 and gearing 82 are disposed coaxially on axis F-F. Gearing 82' is configured to reduce the rotational speed received from motor and increase the torque provided to crank 84. The rotor of motor 16 rotates about axis F-F. Eccentric 104 of crank 84 rotates coaxially with motor 16 on axis F-F. In the example shown, motor 16, gearing 82', and part of the eccentric 104 of crank 84 are coaxial with axis F-F. The axis F-F is orthogonal to pump axis A-A.

Cylinder 50 extends into bucket 36 and can be at least partially submerged in the material in bucket 36. Piston 28 is at least partially disposed within cylinder 50 and extends through mounting frame 48'. Adaptor 230 is at least partially disposed within mounting frame 48. Adaptor 230 is disposed around upper piston portion 140. Adaptor 230 can be in the form of a tube that surrounds at least a part of upper piston portion 140. Upper piston portion 140 extends fully through adaptor 230 such that upper piston portion 140 extends both above and below adaptor 230 along pump axis A-A. Guide bushing 234 is disposed within adaptor 230 and interfaces with upper piston portion 140 of piston 28. Guide bushing 234 assists in aligning piston 28 on pump axis A-A to maintain reciprocation of upper piston portion 140 coaxial with pump axis A-A. Guide bushing 234 further facilitates rotation of adaptor 230 relative to piston 28 and about pump axis A-A, as discussed in more detail below. Adaptor lock 232 interfaces with adaptor 230 to secure the orientation of adaptor 230, and thus drive module 12', relative to pump axis A-A. Adaptor lock 232 is located on mounting frame 48' and can rotate to cover or uncover portions of adaptor 230 to allow release of the adaptor 230 relative to mounting frame 48' or secure adaptor 230 to mounting frame 48'. As shown, the cylinder 50, the lower sealing surface between traveling check valve 128 and cylinder 50, the lower piston portion 142, the upper piston portion 140, the upper seal 136, and the adaptor 230 are coaxial with the pump axis A-A.

Drive module 12' is connected to fluid module 14' by a static connection interface and a dynamic connection interface. The dynamic interface is formed between piston 28 and crank 84. In the example shown, the dynamic interface is formed by head 144 of piston 28 extending into receiving slot 110 of drive link 108. In the example shown, the static interface is formed between clamp 228 and drive frame 86.

Clamp 228 is disposed on an exterior of adaptor 230. The exterior of adaptor 230 includes threading configured to interface with threading formed on one or both of support ring 236 and securing ring 238. Support ring 236 can be statically connected to adaptor 230. Securing ring 238 is disposed on adaptor 230 between support ring 236 and mounting frame 48'. With drive module 12' mounted to fluid module 14' support ring 236 is disposed within drive cavity 112 and securing ring 238 is disposed outside of drive cavity 112. Door 44' is movable to cover and uncover the front opening of drive cavity 112. In the example shown, door 44' is configured to pivot up and away from the front opening of drive cavity 112' when moving from the closed position to the open position.

Ledge 240 is formed around the bottom opening of drive cavity 112' and is received in a gap between support ring 236 and securing ring 238. Support ring 236 is configured to interface with a top surface of ledge 240 and securing ring 238 is configured to interface with a bottom surface of ledge 240. Securing ring 238 is movable relative to adaptor 230 and along pump axis A-A to alter the size of the gap formed between support ring 236 and securing ring 238. For example, securing ring 238 can be rotated to thread securing ring 238 upwards towards support ring 236 to reduce the size of the gap and secure ledge 240 between support ring 236 and securing ring 238. Engagement of clamp 228 can secure drive module 12' to fluid module 14' while disengagement of clamp 228 can unsecure drive module 12' relative to fluid module 14' for separation. The interface between clamp 228 and drive frame 86' structurally connects drive module 12' to fluid module 14' such that drive module 12' is supported by fluid module 14'. While transfer pump 10' is shown as including clamp 228 for forming the static connection, it is understood that other attachment mechanism options are possible.

The entirety of drive module 12' can rotate about axis A-A relative to fluid module 14'. This allows for the cantilevered drive housing 42 to be pointed in any one of 360-degrees relative to pump axis A-A based on the preference of the user. Drive module 12' can be initially mounted to fluid module 14' with drive housing 42 extending in any desired orientation and can be rotated about axis A-A relative to fluid module 14' while drive module 12' remains statically and dynamically connected to fluid module 14'.

Adaptor lock 232 is placed in an unlocked state to allow for rotation of adaptor 230 about axis A-A and relative to fluid module 14'. Drive module 12' is statically connected to adaptor 230 such that drive module 12' rotates with adaptor 230. Adaptor 230 rotates within mounting frame 48 while mounting frame 48 remains stationary and does not rotate. The interface between head 144 and receiving slot 110 allows drive link 108 to be rotated relative to piston 28 while piston 28 does not rotate about pump axis A-A. Adaptor lock 232 can be placed in a locked state to secure drive module 12' in the desired orientation relative to pump axis A-A. As such, the static connection between drive module 12' and fluid module 14' can rotate while structurally supporting drive module 12' on fluid module 14'.

Outlet connector 52" is mounted to mounting frame 48'. Spout 38 is connected to outlet connector 52" and supported by outlet connector 52". In some examples, outlet connector 52" is rotatable about axis G-G such that nozzle 76 can be moved higher or lower depending on the preference of the user. Outlet connector 52 can be rotated about axis G-G so that mud or other pumped material is not directed vertically, but rather horizontally or another direction when exiting outlet connector 52", to fill a mud dispensing tool or otherwise transfer fluid at a location that is level or below the axis G-G. In such a case, spout 38 may be removed from outlet connector 52" such that the mud or other material is output from transfer pump 10' at the outlet of outlet connector 52". In some cases, outlet connector 52" can also be removed so that the pumped mud flows out from the pump outlet 132. In some examples, another outlet connector (e.g., outlet connector 52 (best seen in FIGS. 2A, 2B and 3A) or outlet connector 52' (FIG. 11)) can be connected to mounting frame 48' to receive the pumped fluid from the pump outlet 132. Outlet connector 52" and spout 38 do not rotate with drive module 12' and adaptor 230 about axis A-A.

The coupling between drive module 12' and fluid module 14' allows rotation of the drive module 12' relative to the fluid module 14' while the coupling both entirely supports the drive module 12' in an upright position and permits transfer of reciprocating motion from the drive module 12' to fluid module 14'.

Figure 13A:
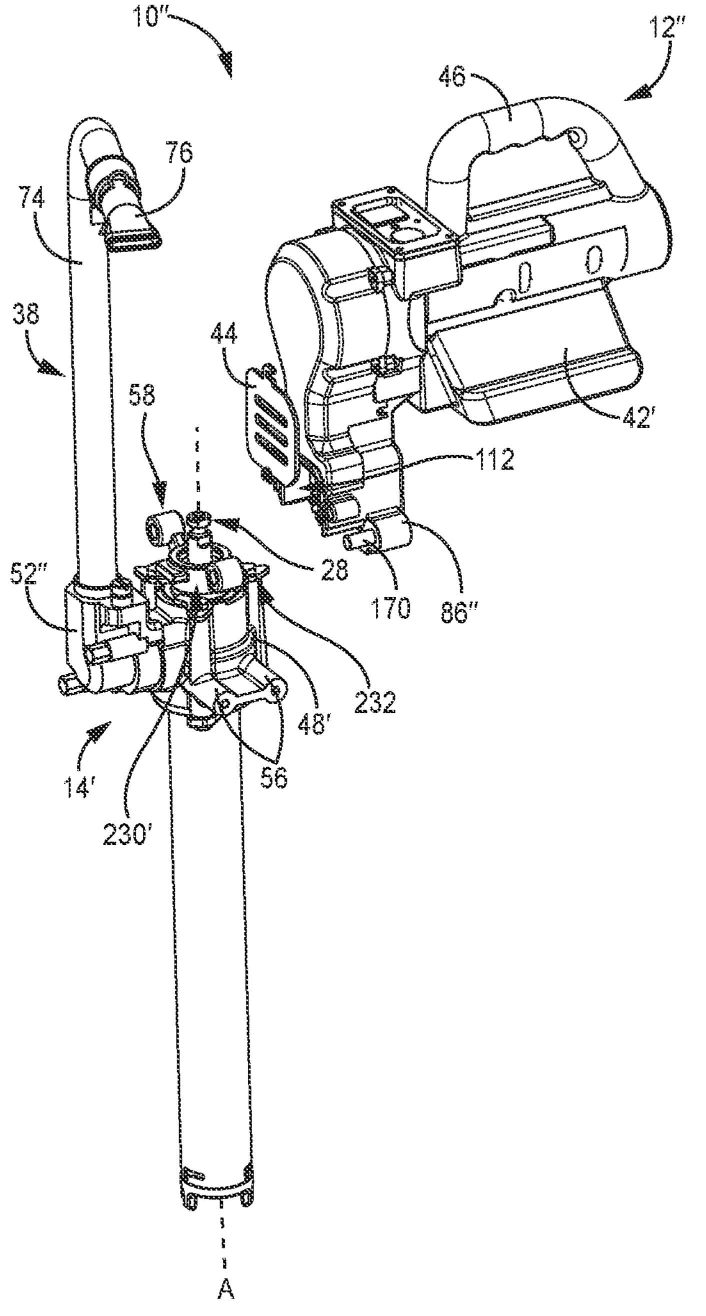
FIG. 13A is an isometric exploded view of a transfer pump.
Figure 13B:
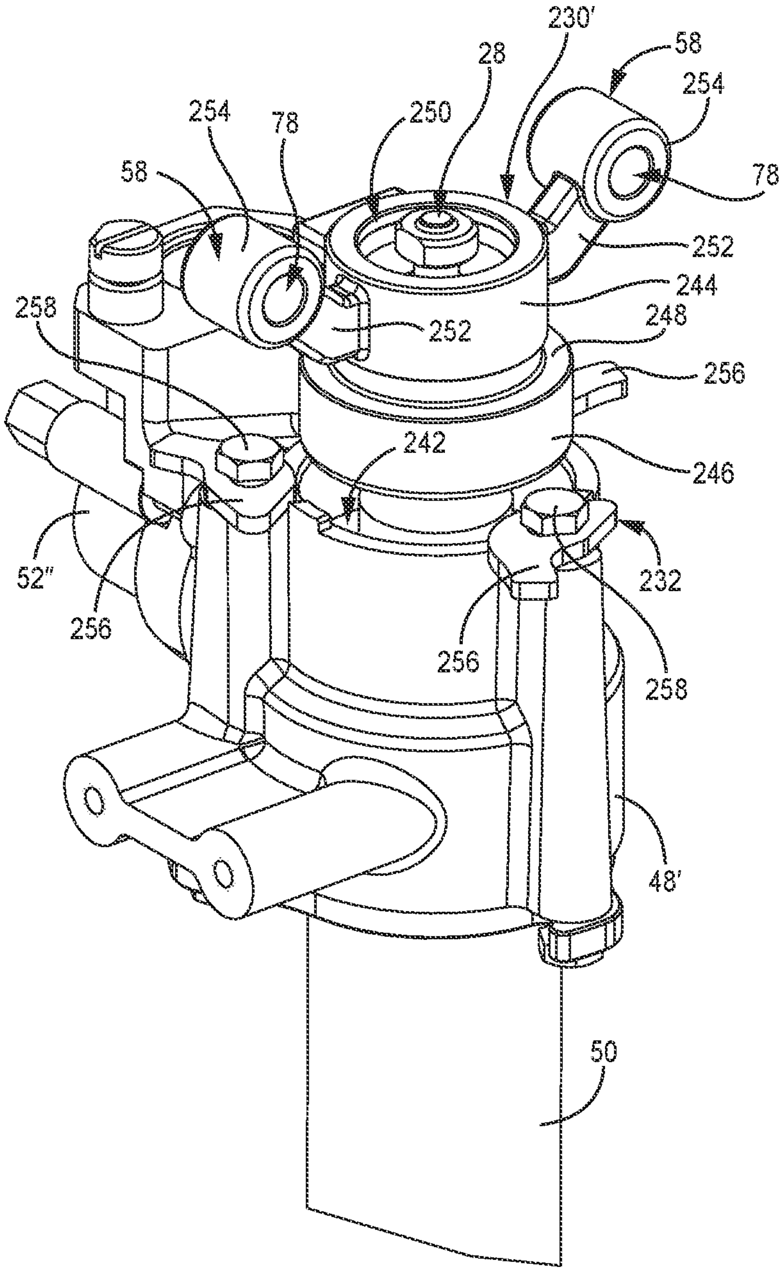
FIG. 13B is an enlarged, partially exploded isometric view showing an adaptor and a mounting frame.
Figure 13C:
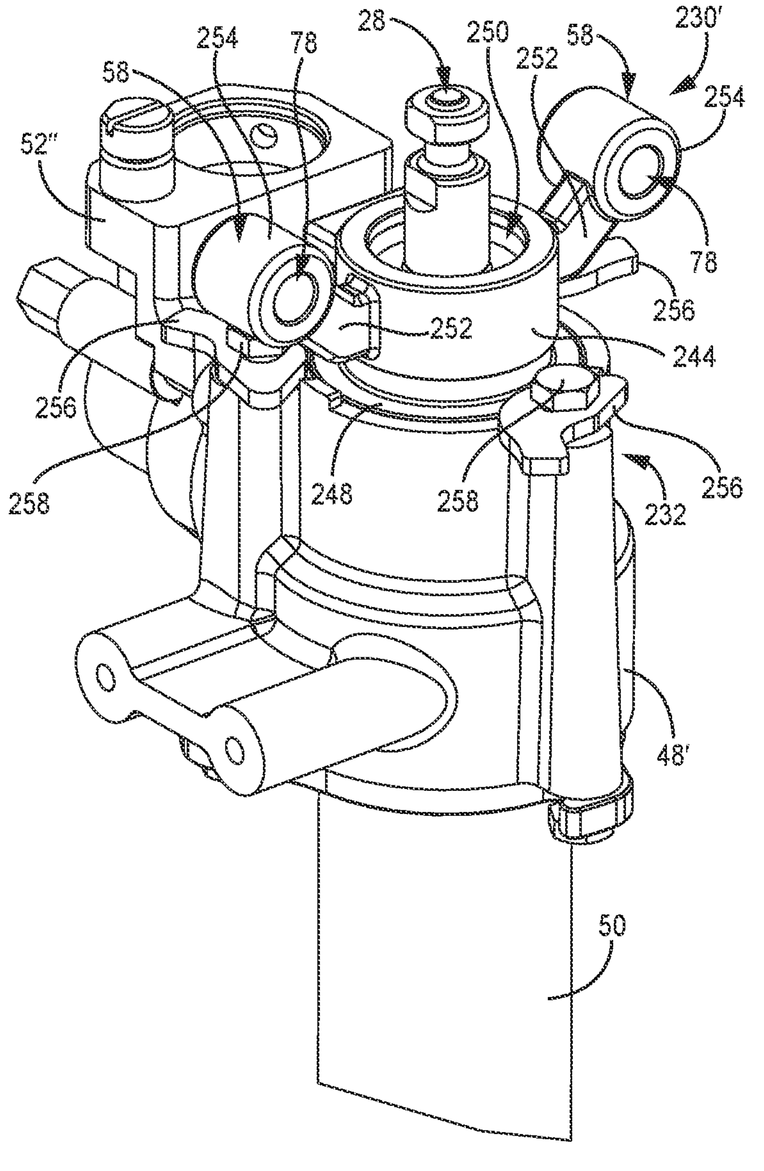
FIG. 13C is an enlarged isometric view showing the adaptor on the mounting frame with an adaptor lock in an unsecured state.
Figure 13D:
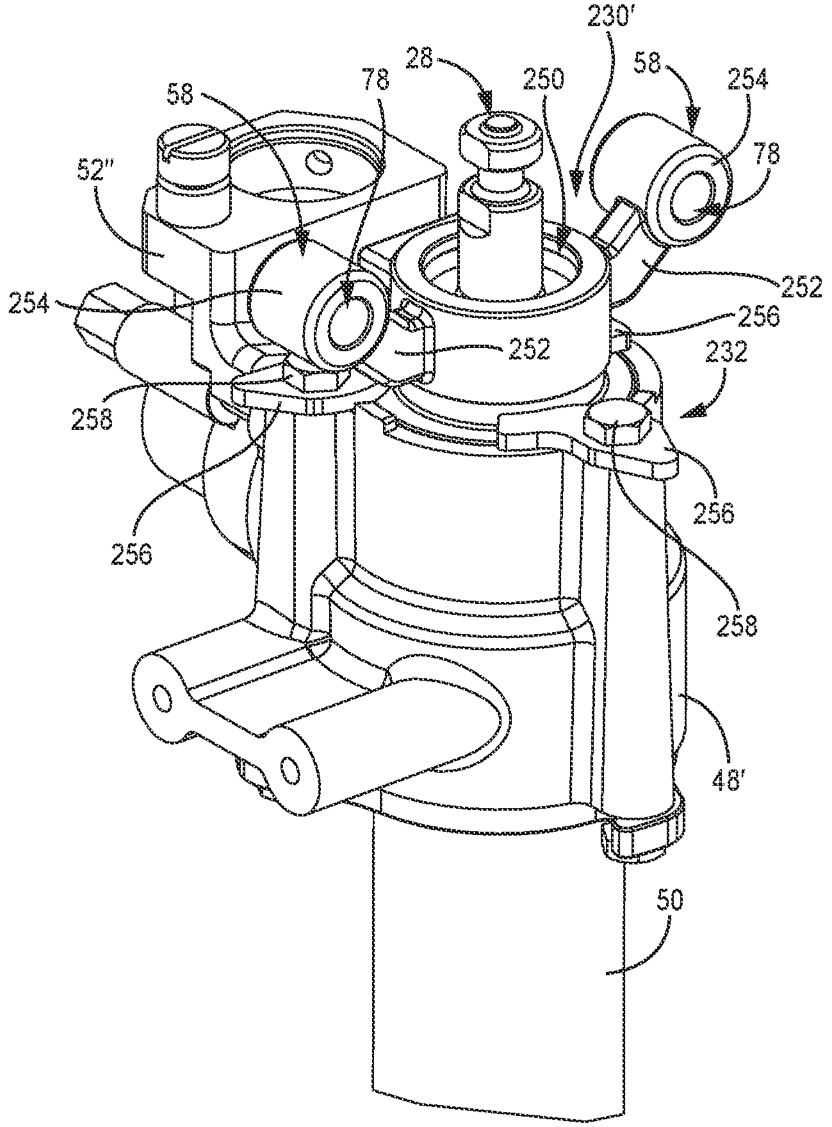
FIG. 13D is an enlarged isometric view showing the adaptor on the mounting frame with the adaptor lock in a secured state.

FIG. 13A is an exploded view of transfer pump 10". FIG. 13B is an enlarged, partially exploded isometric view showing adaptor 230' lifted away from mounting frame 48'. FIG. 13C is an enlarged isometric view showing adaptor 230' on mounting frame 48' with adaptor lock 232 in an unsecured state. FIG. 13D is an enlarged isometric view showing adaptor 230' on mounting frame 48' with adaptor lock 232 in a secured state. FIGS. 13A-13D will be discussed together.

Drive module 12", fluid module 14', and spout 38 of transfer pump 10" are shown. Drive housing 42', door 44, handle 46, and drive frame 86" of drive module 12 are shown. Drive cavity 112 and mounting posts 170 of drive frame 86" are shown. Piston 28, mounting frame 48', cylinder 50, adaptor 230', and adaptor lock 232 of fluid module 14' are shown. Adaptor recess 242 in mounting frame 48' is shown. Adaptor 230' includes receivers 58, upper body 244, lower body 246, annular edge 248, and bore 250. Each receiver 58 includes arm 252, boss 254, and receiver opening 78. Adaptor lock 232 includes tabs 256 and fasteners 258. Tube 74 and nozzle 76 of spout 38 are shown.

Transfer pump 10" is substantially similar to transfer pump 10 (best seen in FIGS. 2A-3B) and transfer pump 10' (FIGS. 12A-12C). Drive module 12" mounts to fluid module 14' by a static interface and a dynamic interface. The static interface is formed by mounting posts 170 extending into receiving openings 78 of receivers 58. The dynamic interface is formed between piston 28 and drive link 108 (best seen in FIGS. 3A-4). While adaptor 230' is shown as connecting to drive module 12", it is understood that adaptor 230' facilitates mounting of various drive modules, such as drive module 12 (best seen in FIGS. 2A-2C).

Adaptor 230' forms part of the static interface between drive module 12" and fluid module 14'. Lower body 246 of adaptor 230' is disposed in adaptor recess 242 in mounting frame 48. Upper body 244 of adaptor 230' is disposed outside of adaptor recess 242. In some examples, the diameter of lower body 246, taken to the outer circumferential edge of lower body 246, is larger than the diameter of upper body 244, taken to the outer circumferential edge of upper body 244. Adaptor 230' defines a bore 250 through which piston 28 extends and within which piston 28 reciprocates during operation. The bore 250 extends fully through adaptor 230', through each of upper body 244 and lower body 246 and is disposed coaxially on pump axis A-A with piston 28. Adaptor 230' is removably mounted to fluid module 14'. Adaptor 230' can be removed from fluid module 14 and replaced with another adaptor, such as adaptor 230 (best seen in FIGS. 12B and 12C), to facilitate different forms of static interface between drive module 12" and fluid module 14'.

Annular edge 248 is formed on a top of lower body 246. Receivers 58 are connected to and project from upper body 244. In the example shown, receivers 58 include arms 252 that extend from upper body 244 and terminate in bosses 254. Receiver openings 78 are formed at the distal ends of arms 252 through bosses 254. In the example shown, the arms 252 extend radially away from pump axis A-A and axially upward relative to pump axis A-A. Upper body 244 is disposed outside of adaptor recess 242 and facilitates the static connection between drive module 12" and fluid module 14'. In the example shown, mounting posts 170 extend from drive frame 86'. Mounting posts 170 are configured to extend into receivers 58. It is understood that other connection types can be facilitated by upper body 244, such as where threading is formed on upper body 244 to facilitate mounting of a clamp 228 (FIGS. 12A-12C) to upper body 244.

Adaptor lock 232 is located on mounting frame 48'. Tabs 256 are disposed on mounting frame 48' proximate adaptor recess 242. Each tab 256 includes a fastener 258 that secures the tab 256 to mounting frame 48. In the example shown, fasteners 258 extend through tabs 256 and into mounting frame 48. Fasteners 258 can be threadedly connected to mounting frame 48. Fasteners 258 can be moved between a locked state and an unlocked state, such as by rotating fasteners 258 relative to mounting frame 48'. With fasteners 258 in the locked state, adaptor 230' is clamped within adaptor recess 242 by tabs 256 such that adaptor 230' is prevented from rotating about axis A-A and relative to mounting frame 48'. With fasteners 258 in the unlocked state, adaptor 230' can rotate about axis A-A and relative to mounting frame 48'.

Tabs 256 can be rotated between the secured state and the unsecured state. Fasteners 258 being in the unlocked state allows for rotation of tabs 256 while fasteners 258 being in the locked state secures tabs 256 to prevent rotation of tabs 256. While adaptor lock 232 is shown as including three tabs 256, it is understood that adaptor lock 232 can include more or fewer than three tabs 256.

Adaptor 230' is shown elevated above adaptor recess 242 in mounting frame 48' in FIG. 13B. Piston 28 extends through bore 250 in adaptor 230'. Tabs 256 are in the unsecured state and rotated away from adaptor recess 242. In the unsecured state, tabs 256 do not extend over adaptor recess 242 such that adaptor 230' can move axially along pump axis A-A to be inserted into adaptor recess 242 or removed from adaptor recess 242.

To install adaptor 230', adaptor 230' is shifted downward along pump axis A-A to the position shown in FIG. 13C such that lower body 246 is at least partially disposed in adaptor recess 242. With adaptor 230' disposed in adaptor recess 242, tabs 256 can be rotated to the secured state shown in 13D such that portions of tabs 256 are disposed over annular edge 248. Tabs 256 being disposed over annular edge 248 prevents adaptor 230' from being lifted vertically out of adaptor recess 242 along pump axis A-A. The user can rotate adaptor 230' about axis A-A and relative to mounting frame 48'. Rotating adaptor 230' allows drive module 12" to be oriented in any desired orientation relative to pump axis A-A. Adaptor 230' can be rotated within adaptor recess 242 with or without drive module 12" mounted on adaptor 230'. Adaptor 230' can be secured in the desired orientation to prevent relative rotation by adaptor lock 232. With adaptor 230' in the desired orientation, fasteners 258 are placed in the locked state to secure adaptor 230' in the desired orientation. For example, fasteners 258 can be rotated to the locked state. In the locked state, fasteners 258 exert a downward force on tabs 256 and tabs 256 exert a downward force on adaptor 230' at the interface of tabs 256 with annular edge 248. The downward force on adaptor 230' clamps adaptor 230' within adaptor recess 242 to prevent rotation of adaptor 230' relative to mounting frame 48' and about pump axis A-A. Fasteners 258 can be loosened to the unlocked state to unclamp adaptor 230' and allow for rotation of adaptor 230' relative to mounting frame 48' and piston 28 and about pump axis A-A. Adaptor 230' is rotatable about pump axis A-A with tabs 256 disposed over annular edge 248 and fasteners 258 in the unlocked state.

Adaptor 230' facilitates mounting drive modules (such as drive module 12 (best seen in FIGS. 2A-2C) or drive module 12") in any desired orientation relative to pump axis A-A. The orientation can be changed depending on the requirements of a particular job site to facilitate placement of the transfer pump at any desired location on the job site. The orientation can be changed by placing fasteners in the unlocked state and rotating the drive module about pump axis A-A. The modular nature of the transfer pump allows for efficient and economic placement of the transfer pump on the job site, increasing work efficiency.

Figure 14:
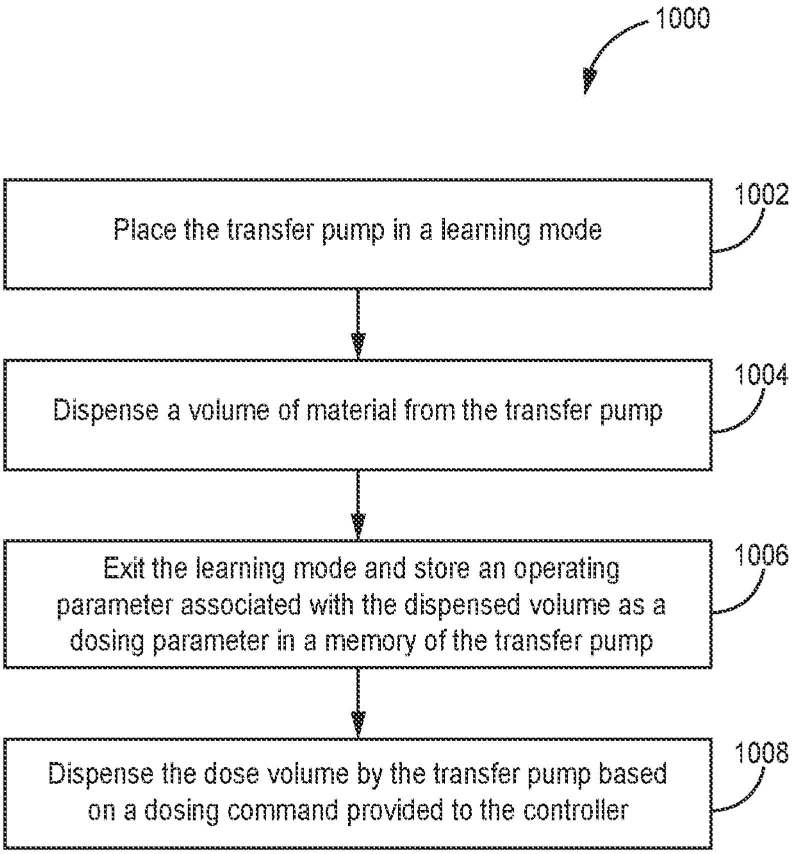
FIG. 14 is a flowchart illustrating a method of dosing.

FIG. 14 is a flowchart showing method 1000 of dosing material from a transfer pump, such as transfer pump 10 (best seen in FIGS. 2A-3B), transfer pump 10' (FIGS. 12A-12C), and transfer pump 10" (FIG. 13A). In step 1002, the transfer pump is placed in a learning mode. For example, a learning mode input of the user interface can be actuated by the user to place the transfer pump in the learning mode. The learning mode input can be a button or type of input. The learning mode input can be a different input from the input utilized to provide a pump command to the controller, such as control module 18 (FIG. 1), of the transfer pump.

In step 1004, the transfer pump is operated to dispense a volume of material. for example, the user can actuate a button or other input to provide a pump command to the controller to cause the controller to power the motor, such as motor 16 (best seen in FIG. 3B) and cause pumping by the transfer pump. With the transfer pump in the learning mode, the control module monitors the operation of transfer pump, such as the duration of motor operation, duration of that the input is actuated (e.g., length of time the button is depressed), number of motor revolutions (full or partial), number of motor pulses, number of pump cycles, or other operating parameter. The controller tracks the operating parameter as the motor operates to pump the material.

In step 1006, the learning mode is exited, and the controller stores the operating parameter associated with the dispensed volume as a dosing parameter that is associated with a dose volume. The volume dispensed with the controller in the learning mode is the dose volume. The dosing parameter is stored in the memory, such as memory 26 (FIG. 1), of the transfer pump and can be recalled during subsequent dosing operations. For example, the transfer pump can include a sensor that senses rotations of the motor. A count of the motor rotations (including full and/or partial rotations) is generated and stored in the memory of the controller. The count of the number of motor rotations is the operating parameter in such an example. In some examples, the control module can exit the learning mode based on the user releasing the button or other input that provides the pump command. For example, the user can release the button or other input just as the desired volume has been dispensed by the transfer pump. The control module can then exit the learning mode based on the user releasing the button or other input and store the operating parameter as the dosing parameter.

In some examples, the control module is configured to aggregate multiple inputs into a single dosing parameter. For examples, the control module can remain in the learning mode after the user releases the button or other input. The user can actuate the input multiple times while in the learning mode and the control module will store each of the inputs in the memory. For example, the user can actuate the input three times and the control module will store the operating parameter for each of those three inputs in the memory. When the learning mode is exited, the control module can aggregate the multiple operating parameters into a single dosing parameter that is stored in the memory. For example, each of the three inputs has an associated number of motor revolutions, where motor revolutions is the operating parameter. The first, second, and third motor revolution counts, associated with the three inputs in this example, are added together to provide an overall motor revolution count that is stored in the memory as the dosing parameter.

Aggregating multiple inputs allows the user to top up the dispensed volume to the desired dose volume. There are many different varieties and configurations of mud dispensing tools. Each user may want to fill their particular tool more or less depending on that user's preference. For example, the user can actuate the input to cause pumping by the transfer pump. The user can release the input to stop pumping as the dispensed volume approaches the desired volume for filling the tool. For example, the user can release the input when a mud dispensing tool is nearly full. The user can actuate the input one or more additional times to cause the transfer pump to pump additional material and top up the dispensed volume to the desired volume. The user can cause the transfer pump to exit the learning mode after topping up the dispensed volume. The controller can determine the dosing parameter based on an aggregate of the total dispenses performed with the controller in the learning mode. Combining multiple dispenses together to define the dosing parameter facilitates the user topping up the dispensed volume to the final desired dose volume. In this way, the user avoids the risk of overfilling or underfilling with a single dispense.

To exit the learning mode, the user can actuate the learning mode input a second time or actuate another input associated with exiting the learning mode. In some examples, the control module is configured to exit the learning mode after a period of time during which no pumping occurs by the transfer pump. For example, the control module can be configured to exit the learning mode based on transfer pump being inactive for 5 seconds, 10 seconds, or another period of time.

In step 1008, the controller causes the transfer pump to dispense the dose volume based on a dosing command received by the controller. The control module recalls the dosing parameter from the memory (e.g., recalls the motor revolution count forming the dosing parameter, among other parameter options). The control module controls operation of the motor based on the recalled dosing parameter to cause the transfer pump to output the dose volume of material based on the dosing command. For example, the user can actuate a button or other input to initiate the dosed output and cause the controller to operate the transfer pump in the dosing mode during which the transfer pump outputs the dose volume. The single selection of the input to provide the dosing command causes the control module to operate the motor based on the dosing parameter. During the dosing mode, the controller can control operation of the motor such that the motor operates continuously for a single period to cause the transfer pump to dispense the dose volume of the material. For example, while the user may set the dose volume by actuating the input five different times for an aggregated total of twelve seconds of motor operation, the control module can cause the motor to operate for twelve consecutive seconds to dispense the dose volume of material. Upon depressing the dose button, the control module can operate the motor for the learned duration, number of motor revolutions, number of motor pulses, or other parameter corresponding with the desired volume.

Method 1000 provides significant advantages. The user can set whatever dose volume is desired for a tool or job. The control module monitors function of the motor while learning the dosing parameter and repeats the learned function in a continuous output to provide the dosing volume. The transfer pump outputting the set dose volume based on the dose command allows the user to perform a single action by actuating the input to cause the transfer pump to output the desired volume. The user is not required to continuously depress a button to cause pumping. In this way, the user can approach the transfer pump, fit the tool (e.g., mud dispensing tool) to the nozzle, such as nozzle 76 (best seen in FIGS. 8A-8C), press a single button, and receive the desired dose of material (e.g., mud). Method 1000 thereby provides an efficient, quick, and accurate dispense of the desired volume.

Providing the desired volume in a single dose also reduces downtime and allows the user to more quickly and efficiently complete jobs. The accurate pumping of the dose volume prevents overfilling of the mud dispensing tool, which can cause irreparable damage to such a tool. The accurate pumping thereby saves time and costs. The user can set the desired volume over the course of several actuations of the input, which allows the user to fully fill the mud dispensing tool while incrementally filling the final volume into the mud dispensing tool. Incrementally providing the final volume into the mud dispensing tool allows the mud dispensing tool to be filled as fully as possible without risking overfilling, allowing more mud to be dispensed between fills, thereby reducing downtime.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A transfer pump configured to pump material, the transfer pump comprising:

a fluid module including a fluid moving member configured to reciprocate along a pump axis to pump the material; and a drive module including:

an electric motor operatively connected to the fluid moving member to power reciprocation of the fluid moving member; and a control module operably connected to the electric motor, the control module configured to:

enter a learning mode based on the control module receiving a learning mode command from a user interface, the learning mode command generated based on actuation of a second input of the user interface;

receive a dispense command from the user interface based on manual actuation of a first input of the user interface while in the learning mode, the first input different from the second input, the dispense command having a duration representative of how long the first input of the user interface is manually actuated, wherein, while in the learning mode, the control module activates the electric motor to cause pumping of the material while the first input is manually actuated and causes the electric motor to stop pumping of the material based on release of the first input;

monitor operation of the drive module while operating the electric motor to power reciprocation of the fluid moving member to pump the material in response to the dispense command while in the learning mode and store, in a memory of the control module, an operating parameter associated with a volume of the material dispensed while pumping based on the dispense command in the learning mode as a dosing parameter, the volume forming a dose volume;

exit the learning mode based on release of the first input and enter into an operating mode other than the learning mode based on the release of the first input;

receive a dosing command from the user interface;

recall, from the memory, the dosing parameter based on the dosing command; and operate the electric motor based on the dosing parameter and in response to the dosing command to cause the electric motor to drive reciprocation of the fluid moving member such that the transfer pump outputs the dose volume.

2. The transfer pump of claim 1, wherein the operating parameter is a count of motor revolutions.

3. The transfer pump of claim 1, wherein the dosing command is provided to the control module as a single button push.

4. The transfer pump of claim 1, wherein the dosing parameter is one of a number of rotations of the electric motor, a number of cycles of the reciprocating pump, a duration of operation of the electric motor, and a number of pulses of the electric motor.

5. The transfer pump of claim 1, wherein the control module is configured to remain in the learning mode with the first input released.

6. The transfer pump of claim 5, wherein the control module is configured to exit the learning mode based on one of a second actuation of the second input and the transfer pump being inactive for a predetermined time period.

7. The transfer pump of claim 1, wherein the operating parameter is based on a duration in which a button is pressed, the button forming the first input.

8. The transfer pump of claim 7, wherein the operating parameter is based on a duration in which the button is continuously pressed.

9. The transfer pump of claim 1, wherein the control module is configured to aggregate multiple dispenses while in the learning mode to generate the dosing parameter, and wherein the control module is configured to operate the electric motor to output the dose volume in a single dispense.

10. The transfer pump of claim 1, wherein the control module is configured to cause the electric motor to continuously operate to cause the transfer pump to output the dose volume.

11. A transfer pump configured to pump material, the transfer pump comprising:

a fluid moving member configured to reciprocate along a pump axis to pump the material;

an electric motor operatively connected to the fluid moving member to power reciprocation of the fluid moving member;

a user interface; and a controller including control circuitry and memory, the controller operably connected to the user interface and to the electric motor, the control circuitry configured to:

enter a learning mode based on the controller receiving a learning mode command from the user interface;

receive a dispense command from the user interface, the dispense command having a duration representative of how long the dispense command is manually input to the user interface;

based on receiving the dispense command while in the learning mode, operate the electric motor to cause the fluid moving member to reciprocate to pump the material for the duration to dispense a volume of the material and save to the memory a dosing parameter;

exit the learning mode;

receive a dose command via the user interface by actuation of a first input of the user interface while out of the learning mode; and recall from the memory the dosing parameter based on the dose command; and based on receiving the dose command, operate the electric motor to cause the fluid moving member to reciprocate to pump the volume of the material;

the controller configured to cause the electric motor to continue causing the fluid moving member to reciprocate to pump upon release of the first input to cause the transfer pump to output the volume of the material.

12. A transfer pump configured to pump material, the transfer pump comprising:

a fluid moving member configured to reciprocate along a pump axis to pump the material;

an electric motor operatively connected to the fluid moving member to power reciprocation of the fluid moving member;

a user interface; and a controller having control circuitry and memory, the controller operably connected to the user interface and to the electric motor, the controller configured to:

receive one or more dispense commands from the user interface in association with a learning mode, the one or more dispense commands respectively having one or more durations representative of how long a user manually input the one or more dispense commands;

based on receiving the one or more dispense commands in association with the learning mode, operate the electric motor to cause the fluid moving member to reciprocate to pump the material for the one or more durations to respectively dispense one or more volumes of the material and save to the memory a dosing parameter;

receive a dose command via the user interface which is not associated with the learning mode; and recall from the memory the dosing parameter based on the dose command; and based on receiving the dose command, operate the electric motor to cause the fluid moving member to reciprocate to pump the one or more volumes of the material in one continuous dispense based on the dosing parameter;

wherein the controller is configured to exit the learning mode based on the transfer pump being inactive for a predetermined time period.

13. The transfer pump of claim 12, wherein the dosing parameter is based on an aggregate number of motor revolutions to dispense the one or more volumes of the material.

14. The transfer pump of claim 12, wherein the dosing parameter is based on an aggregate number of reciprocations of the fluid moving member to dispense the one or more volumes of the material.

15. The transfer pump of claim 12, wherein the dosing parameter is based on an aggregate duration of the one or more durations.

16. The transfer pump of claim 12, wherein the dosing command is input as a single button push.

17. The transfer pump of claim 12, wherein the one or more dispense commands is a single dispense command, the one or more durations is a single duration, and the one or more volumes is a single volume.

18. The transfer pump of claim 12, wherein the one or more dispense commands comprises a plurality of dispense commands, the one or more durations comprises a plurality of durations, and the one or more volumes comprises a plurality of volumes of different dispenses of the material.

19. A transfer pump configured to pump material, the transfer pump comprising:

a fluid module including a fluid moving member configured to reciprocate along a pump axis to pump the material; and a drive module including:

an electric motor operatively connected to the fluid moving member to power reciprocation of the fluid moving member; and a control module operably connected to the electric motor, the control module configured to:

enter a learning mode based on the control module receiving a learning mode command from a user interface;

receive a plurality of dispense commands from the user interface based on a plurality of manual actuations of a first input of the user interface while in the learning mode, each dispense command of the plurality of dispense commands having a duration representative of how long the first input of the user interface is manually actuated, wherein, while in the learning mode, the control module activates the electric motor to cause pumping of the material while the first input is manually actuated and causes the electric motor to stop pumping of the material based on release of the first input;

monitor operation of the drive module while operating the electric motor to power reciprocation of the fluid moving member to pump the material in response to the plurality of dispense commands while in the learning mode and store, in a memory of the control module, a plurality of operating parameters, each operating parameter of the plurality of operating parameters associated with a volume of the material dispensed while pumping based on a dispense command of the plurality of dispense commands while in the learning mode;

aggregate the plurality of operating parameters generated while in the learning mode to generate a dosing parameter such that a dose volume is formed by a plurality of the volumes of the material dispensed while in the learning mode;

exit the learning mode;

receive a dosing command from the user interface;

recall, from the memory, the dosing parameter based on the dosing command; and operate the electric motor based on the dosing parameter and in response to the dosing command to cause the electric motor to drive reciprocation of the fluid moving member such that the transfer pump outputs the dose volume, the control module is configured to operate the electric motor to output the dose volume in a single dispense.

* * * * *